United States Patent
Matsuyama

(10) Patent No.: US 8,682,133 B2
(45) Date of Patent: Mar. 25, 2014

(54) IMAGE PROCESSING APPARATUS

(75) Inventor: Ichiro Matsuyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1911 days.

(21) Appl. No.: 11/674,987

(22) Filed: Feb. 14, 2007

(65) Prior Publication Data
US 2007/0200939 A1 Aug. 30, 2007

(30) Foreign Application Priority Data
Feb. 28, 2006 (JP) .................. 2006-053382

(51) Int. Cl.
*H04N 5/77* (2006.01)

(52) U.S. Cl.
USPC .......................... 386/224; 386/225

(58) Field of Classification Search
USPC ............ 386/223–225, 328–334, 248
See application file for complete search history.

(56) References Cited

U.S. PATENT DOCUMENTS

| | | | |
|---|---|---|---|
| 6,791,578 B1 * | 9/2004 | Ubillos | 715/716 |
| 7,649,552 B2 * | 1/2010 | Fukuda | 348/220.1 |
| 2002/0118949 A1 * | 8/2002 | Jones et al. | 386/68 |
| 2004/0189827 A1 * | 9/2004 | Kim et al. | 348/231.4 |
| 2004/0208481 A1 | 10/2004 | Hosokawa | |
| 2004/0223747 A1 * | 11/2004 | Otala et al. | 386/125 |
| 2005/0083414 A1 | 4/2005 | Hidaka et al. | |
| 2006/0050140 A1 * | 3/2006 | Shin et al. | 348/14.02 |
| 2006/0288113 A1 * | 12/2006 | Saunders et al. | 709/231 |
| 2007/0081085 A1 | 4/2007 | Ishii et al. | |

FOREIGN PATENT DOCUMENTS

| | | |
|---|---|---|
| JP | 2004-201170 A | 7/2004 |
| JP | 2004-297229 A | 10/2004 |
| JP | 2007-110223 A | 4/2007 |

* cited by examiner

*Primary Examiner* — Thai Tran
*Assistant Examiner* — Nigar Chowdhury
(74) *Attorney, Agent, or Firm* — Canon USA Inc. IP Division

(57) ABSTRACT

An image processing apparatus reproduces still image data recorded on a recording medium and designates an aspect ratio of moving image data to be generated using the still image data. The image processing apparatus converts an aspect ratio of the reproduced still image data according to the designated aspect ratio and generates moving image data using the converted still image data to output the generated moving image data as still image movie data. The image processing apparatus records the still image movie data on the recording medium.

18 Claims, 27 Drawing Sheets

FIG.2
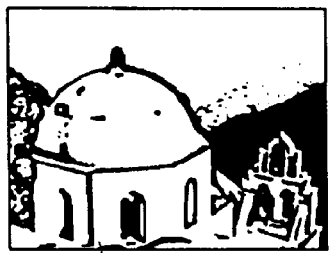
201
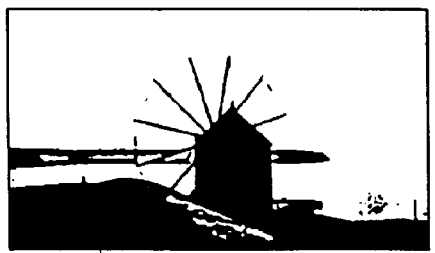
202
FIG.3
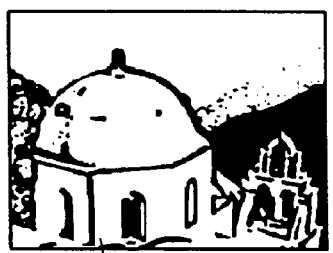
301
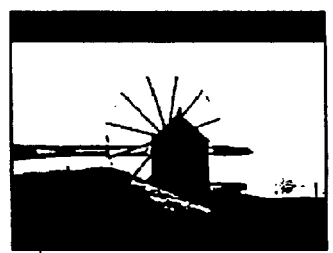
302

FIG.4
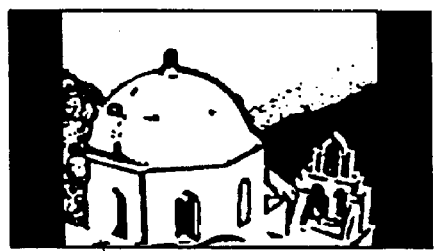
401
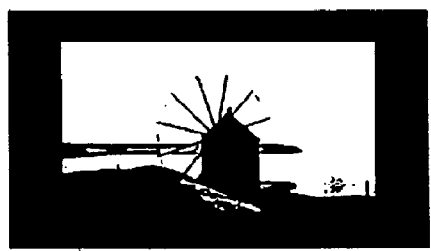
402
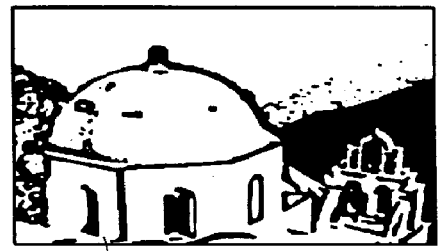
411
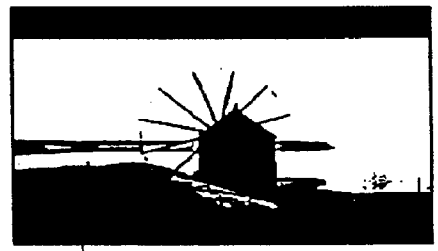
412
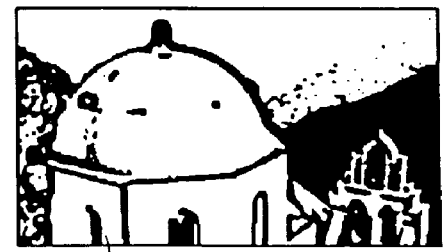
421
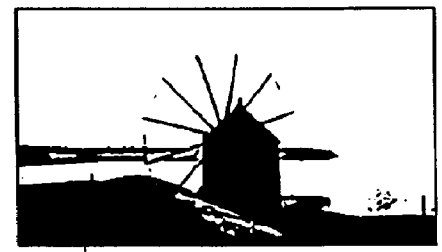
422

FIG.9
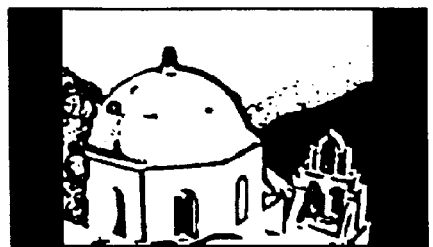
901
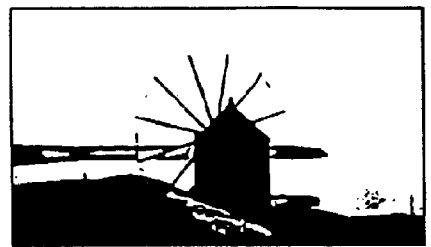
902
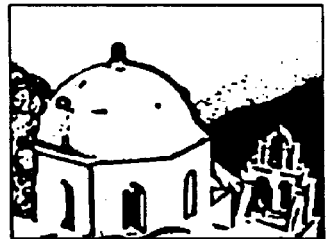
911
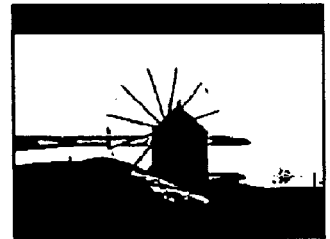
912

FIG.27

| x | y | G |
|---|---|---|
| 2 | 1 | 1 |
| ... | ... | ... |
| 1 | 1 | 2 |
| ... | ... | ... |
| 90 | 50 | 2 |

IMAGE PROCESSING APPARATUS

BACKGROUND OF THE INVENTION

1. Field of the Invention

The present invention relates to an image processing apparatus, and more particularly to a technology suitably used for an apparatus configured to record a moving image and a still image in a mixed or mingled manner.

2. Description of the Related Art

There has conventionally been known an apparatus configured to record a television broadcast program on a digital versatile disc (DVD). Recently, DVD video cameras configured to record a moving image or still image photographed by a camera on a DVD have been marketed.

In the case of recording a moving image signal on a DVD, moving image data is encoded according to an MPEG coding method to be recorded based on DVD-Video format or DVD Video Recording format (VR format). The moving image data thus recorded can be reproduced by a reproducing apparatus such as a DVD player corresponding to each format. In DVDs, Universal Disk Format (UDF) is defined as a file system. Moving image data is recorded as a file compliant with the UDF.

On the other hand, still image data is recorded on a DVD as a still image file complaint with the UDF. Accordingly, a general DVD player capable of reproducing only moving image data of the DVD-Video format or the VR format cannot reproduce such still image data recorded on a DVD.

Under these circumstances, technologies have been developed to enable a DVD player to reproduce still image data by decoding still image data recorded on a DVD, then encoding the decoded data again according to the MPEG coding method, and converting the coded data into data of the DVD-Video format or the VR format to record it on a DVD (hereinafter referred to as "photomovie") (refer to Japanese Patent Application Laid-open No. 2004-201170, which corresponds to U.S. Patent Application Publication No. 2005/0083414 A1, and Japanese Patent Application Laid-open No. 2004-297229, which corresponds to U.S. Patent Application Publication No. 2004/0208481 A1).

Wide-screen television or high-definition broadcast having an aspect ratio of 16:9 has recently become widespread. Accordingly, digital cameras have been marketed which can photograph not only an image having a conventional aspect ratio of 4:3 or 3:2 but also a still image having an aspect ratio of 16:9 to obtain a wide picture.

As described above, a still image having an aspect ratio of 4:3 and a still image having an aspect ratio 16:9 may be recorded on the same DVD in a mixed or mingled manner. Now, consideration will be given to generation of a photomovie from the still image data thus recorded.

FIG. 2 shows two still image data recorded on one DVD, i.e., a still image 201 having an aspect ratio of 4:3 and a still image 202 having an aspect ratio of 16:9. In the case of generating a photomovie from these still image data, for example, the image 202 is converted into an image having an aspect ratio of 4:3 by being uniformly padded on the top and bottom sides with a black image.

FIG. 3 shows images of a photomovie generated in this manner. An image 301 is obtained from the image 201 with its aspect ratio unchanged, and an image 302 is obtained from the image 202 converted into a letter box form having an aspect ratio of 4:3.

However, when the photomovie thus generated is displayed on a wide-screen television set, there may be a problem of impossibility of obtaining a good display result. That display result will be described below with reference to FIG. 4.

(1) When the wide-screen television set is set to display an image having an aspect ratio of 4:3 in the center of the screen by being uniformly padded on the left and right sides with a black image or the like, a display result 401 of the image 301 shows an object with an original aspect ratio. The entire image is displayed without being cropped. However, in the case of a display result 402 of the image 302, there is a problem of useless padding on the left, right, top, and bottom sides with a black image.

(2) When the wide-screen television set is set to display an image having an aspect ratio of 4:3 with an aspect ratio of 16:9 by stretching it leftwards and rightwards, there is a problem of horizontal extension of the aspect ratio of an object in a display result 411 of the image 301. In the case of a display result 412 of the image 302, there is a problem of leaving of useless black images in upper and lower parts in addition to the horizontal extension of the aspect ratio of an object.

(3) When the wide-screen television set is set to display an area having an aspect ratio 16:9 of the center by uniformly cropping upper and lower parts of an image having an aspect ratio of 4:3, a display result 421 of the image 301 shows an object with an original aspect ratio. However, there is a problem that the entire image is not displayed as its upper and lower parts are cropped. On the other hand, a display result 422 of the image 302 shows an object with an original aspect ratio, and the entire image is displayed without being cropped.

As described above, when a plurality of still images of different aspect ratios are recorded in a mixed or mingled manner, a photomovie generated from these still images may not be properly displayed on a wide-screen television set in many cases.

SUMMARY OF THE INVENTION

At least one exemplary embodiment of the present invention is directed to generating moving image data which enables a plurality of still images having different aspect ratios to be properly displayed on display devices having various aspect ratios, for example, on a wide-screen display device and/or a normal-screen display device.

According to an aspect of the present invention, an image processing apparatus configured to generate moving image data using still image data recorded on a recording medium on which moving image data and still image data are capable of being recorded and to record the generated moving image data on the recording medium includes a still image reproduction unit configured to reproduce still image data recorded on the recording medium, a designation unit configured to designate an aspect ratio of moving image data to be generated using the still image data, a conversion unit configured to convert an aspect ratio of the still image data reproduced by the still image reproduction unit according to the aspect ratio designated by the designation unit, a generation unit configured to generate moving image data using the still image data converted by the conversion unit to output the generated moving image data as still image movie data, and a recording unit configured to record the still image movie data generated by the generation unit on the recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram showing an example of a still image recorded on a DVD.

FIG. 3 is a diagram showing an example of a still image converted into a photomovie having an aspect ratio of 4:3.

FIG. 4 is a diagram showing an example of a display result of a photomovie on a wide-screen television set.

FIG. 9 is a diagram showing an example of a display result of a photomovie.

FIG. 27 is a diagram showing an example of information used for generating a play list.

DETAILED DESCRIPTION OF THE EMBODIMENTS

Various exemplary embodiments, features, and aspects of the present invention will be described in detail below with reference to the drawings.

First Exemplary Embodiment

A first exemplary embodiment will be described by way of a case where the invention is applied to an image processing apparatus, such as, for example, a video camera which uses a DVD as a recording medium. When executing finalization processing for a DVD logically formatted based on the DVD-Video format, a video camera according to the first exemplary embodiment converts still image data recorded on the DVD into moving image data to generate a photomovie. In this case, a user can select an aspect ratio of the photomovie.

Figure 1:
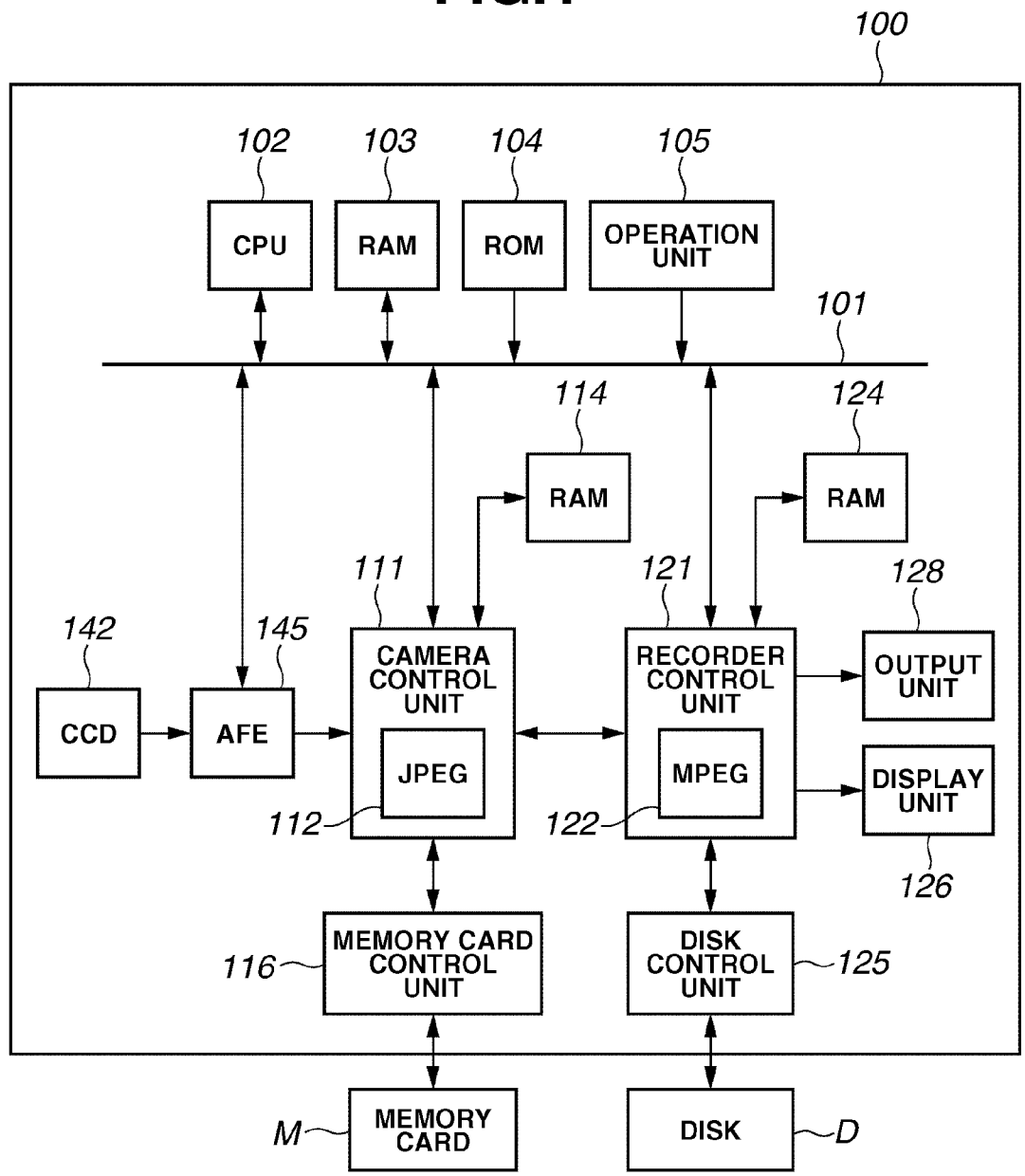
FIG. 1 is a block diagram showing a configuration of a video camera according to an exemplary embodiment of the present invention.

FIG. 1 is a block diagram showing a configuration example of a video camera according to the first exemplary embodiment.

The video camera 100 includes a central processing unit (CPU) 102. A random access memory (RAM) 103, a read-only memory (ROM) 104, an operation unit 105, a camera control unit 111, a recorder control unit 121, and an analog front end (AFE) 145 are connected to the CPU 102 via a bus 101. The AFE 145 supplies a signal generated by a charge-coupled device (CCD) 142 to the camera control unit 111. The CPU 102 operates according to a control program stored in the ROM 104 and uses the RAM 103 as a temporary information storage unit during the operation.

The video camera 100 includes operation keys such as a mode dial, a shutter button, and an arrow key (not shown). The state of a key operation by a user is held in the operation unit 105. The control program for the CPU 102 periodically obtains the state of a key operation from the operation unit 105. The control program for the CPU 102 controls the camera control unit 111 and the recorder control unit 121 based on the obtained state of a key operation to execute reproduction processing of a moving image, reproduction processing of a still image, finalization processing, and photomovie generation processing.

The video camera 100 can photograph and record a wide image having an aspect ratio of 16:9 and a normal image having an aspect ratio of 4:3. The user can select one of the two images by operating the keys.

According to the present exemplary embodiment, a wide image and a normal image can be photographed and recorded with respect to each of a moving image and a still image.

The camera control unit 111 is an application specific integrated circuit (ASIC) operating based on the control program. The camera control unit 111 uses a RAM 114 as a temporary image signal storage unit in signal processing. The camera control unit 111 converts image data received from the AFE 145 into a wide image having an aspect ratio of 16:9 or a normal image having an aspect ratio of 4:3 based on an instruction from the CPU 102. The camera control unit 111 controls a memory card control unit 116 to write and read image data into or from a memory card M.

The camera control unit 111 processes a moving image signal received from the AFE 145 and sends the processed signal to the recorder control unit 121 during recording of a moving image. During reproduction of a still image recorded on a disk D, the camera control unit 111 receives an encoded signal from the recorder control unit 121, decodes the signal with a JPEG codec 112, and processes the obtained image signal to output it to the recorder control unit 121.

The recorder control unit 121 is an ASIC operating based on the control program. The recorder control unit 121 uses a RAM 124 as a temporary image signal storage unit in signal processing.

During recording of a moving image signal, the recorder control unit 121 encodes a moving image signal received from the camera control unit 111 with an MPEG codec 122 and sends the encoded data to the disk control unit 125. Then, the recorder control unit 121 controls the disk control unit 125 to record the encoded moving image data on the disk D. In this case, the disk control unit 125 also records information on an aspect ratio of the moving image data on the disk D.

During reproduction of a moving image recorded on the disk D, the recorder control unit 121 controls the disk control unit 125 to read moving image data recorded in DVD-Video format or DVD Video Recording (VR) format and decodes the moving image data with the MPEG codec 122. Then, the recorder control unit 121 outputs the decoded moving image signal to the camera control unit 111.

During recording of a still image signal, the recorder control unit 121 receives encoded still image data from the camera control unit 111 and controls the disk control unit 125 to record the still image data on the disk D. In this case, the disk control unit 125 also records information on an aspect ratio of the still image data on the disk D.

During reproduction of a still image recorded on the disk D, the recorder control unit 121 controls the disk control unit 125 to read still image data from the disk D and outputs the still image data as an encoded signal to the camera control unit 111. Additionally, the recorder control unit 121 outputs an image signal received from the camera control unit 111 to an output unit 128 and a display unit 126 during reproduction processing of moving image data and during reproduction processing of still image data.

Figure 5:
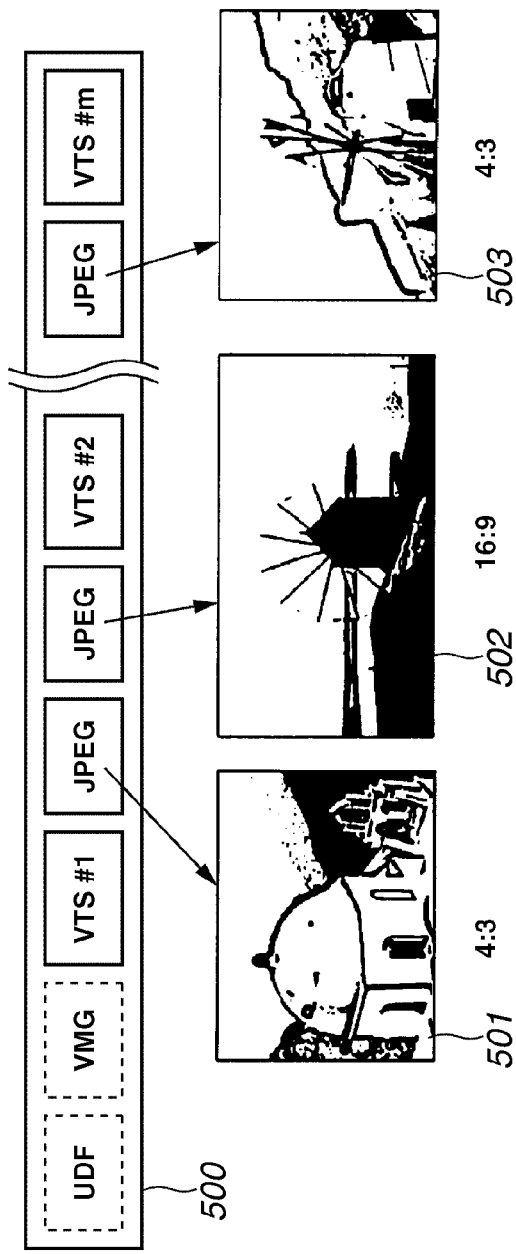
FIG. 5 is a diagram showing an example of recorded contents before finalization processing and photomovie generation processing of a DVD of the DVD-Video format.

FIG. 5 shows recorded contents 500 of the disk D before finalization processing. The recorded contents 500 of the disk D are logically formatted based on DVD-Video format and includes moving images and still images. According to the DVD-Video format, DVD video data includes, in order from an inner periphery of a DVD, a Universal Disc Format (UDF) area serving as a file system, a Video Manager (VMG) area for managing entire video data, and a maximum of 99 Video Title Sets (VTSs).

The UDF area and the VMG area are in unrecorded states before the finalization processing so as to write contents into the UDF area and the VMG area during the finalization processing. Moving images are recorded in VTSs #1, #2, . . . , #m for every title. Still images 501 to 503 are encoded according to the JPEG coding method and recorded as still image files. Information on these still images is not managed by the VMG. Conventional DVD players cannot reproduce these still image files as they reproduce only video data managed by the VMG.

Figure 6:
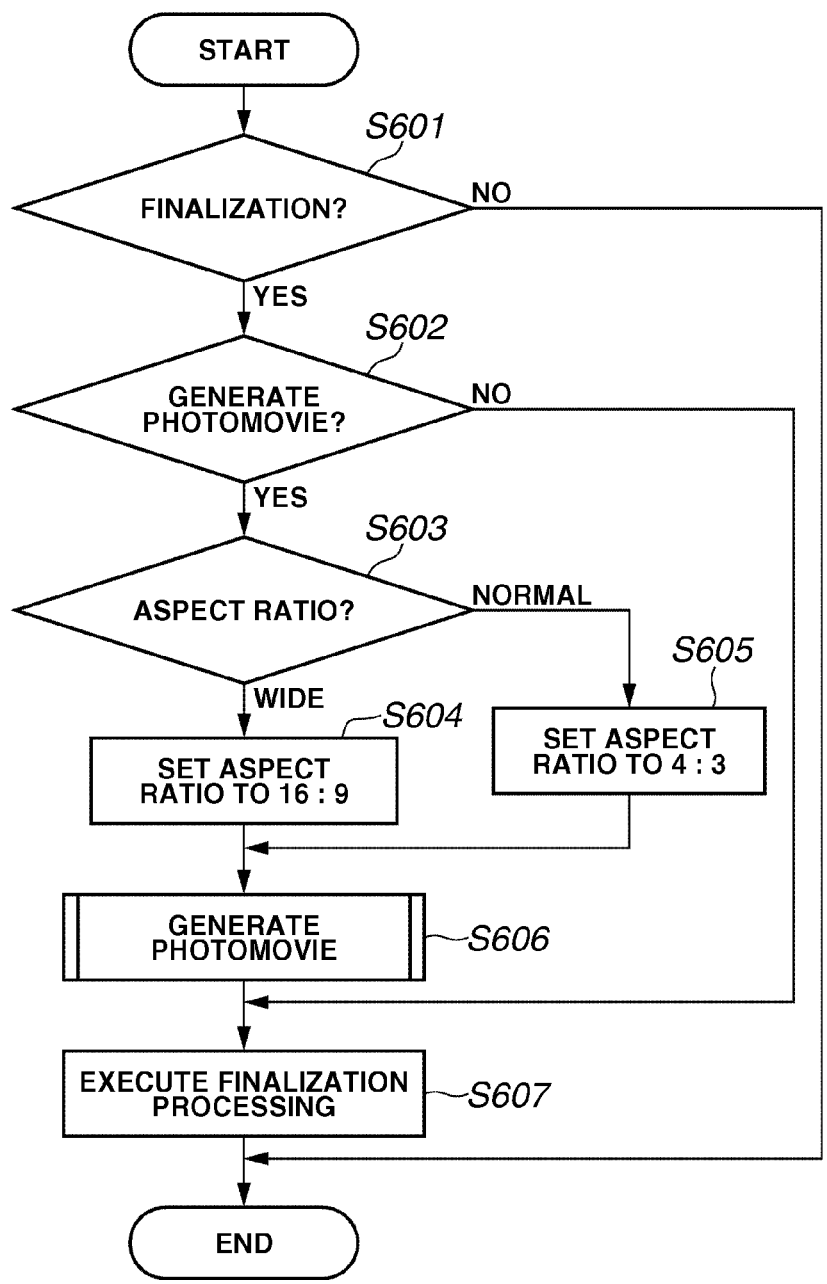
FIG. 6 is a flowchart showing an example of the finalization processing and the photomovie generation processing.

FIG. 6 is a flowchart showing the finalization processing and the photomovie generation processing performed by the CPU 102.

The finalization processing is processing for recording UDF information, VMG information, and the like on a DVD so as to convert video data recorded according to the DVD-Video format into video data reproducible by other players.

According to the present exemplary embodiment, the CPU 102 starts a flow of processing upon reception of a finalization instruction from a user at optional timing.

Figure 7:
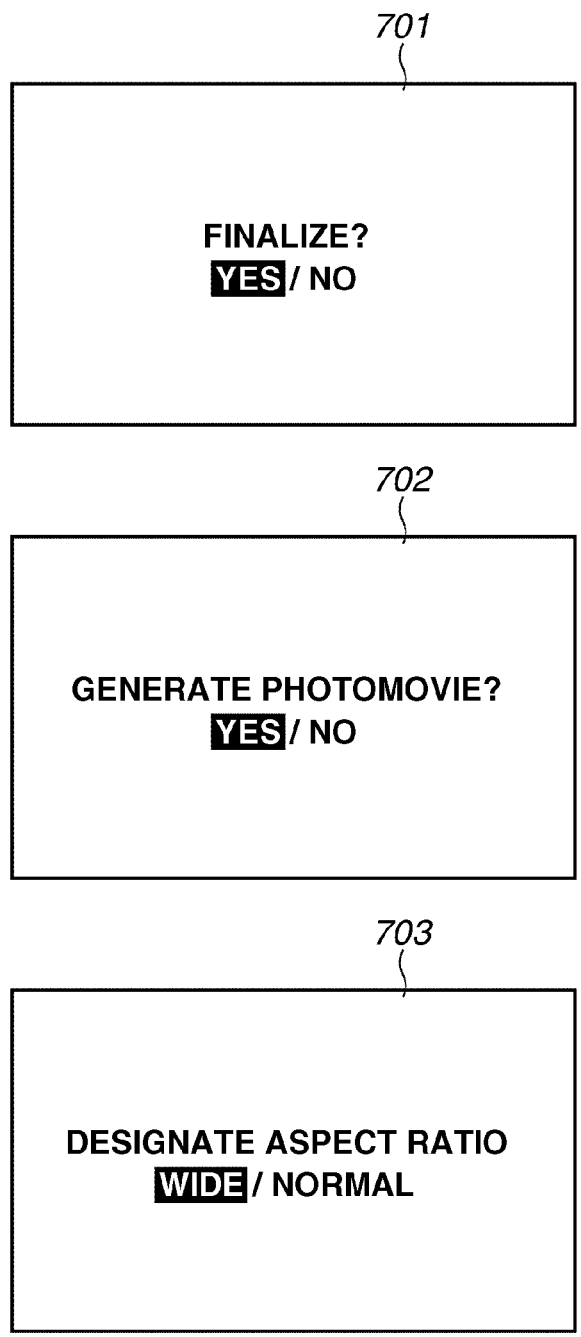
FIG. 7 is a diagram showing an example of a display screen during the finalization processing.

First, in step S601, the CPU 102 displays a screen 701 shown in FIG. 7 on the display unit 126 to enable the user to select execution/nonexecution of finalization processing. The CPU 102 obtains a user's selection result based on an operation state of the operation unit 105. The process proceeds to step S602 if the finalization processing is instructed (YES in step S601). If the finalization processing is not instructed (NO in step S601), the process ends.

In step S602, the CPU 102 displays a screen 702 shown in FIG. 7 on the display unit 126 to enable the user to select generation/nongeneration of a photomovie. The CPU 102 obtains a user's selection result based on an operation state of the operation unit 105. The process proceeds to step S603 if the photomovie generation is instructed (YES in step S602). If the photomovie generation is not instructed (NO in step S602), the process proceeds to step S607.

In step S603, the CPU 102 displays a screen 703 shown in FIG. 7 on the display unit 126 to enable the user to select an aspect ratio of a photomovie to be generated. The CPU 102 obtains a user's selection result based on an operation state of the operation unit 105. The CPU 102 sets the aspect ratio to 16:9 in step S604 if "WIDE" is selected in step S603. If "NORMAL" is selected in step S603, the CPU 102 sets the aspect ratio to 4:3 in step S605.

Next, in step S606, the CPU 102 generates a photomovie according to the aspect ratio determined in step S604 or S605. Then, in step S607, the CPU 102 performs finalization processing of the disk D.

Figure 8:
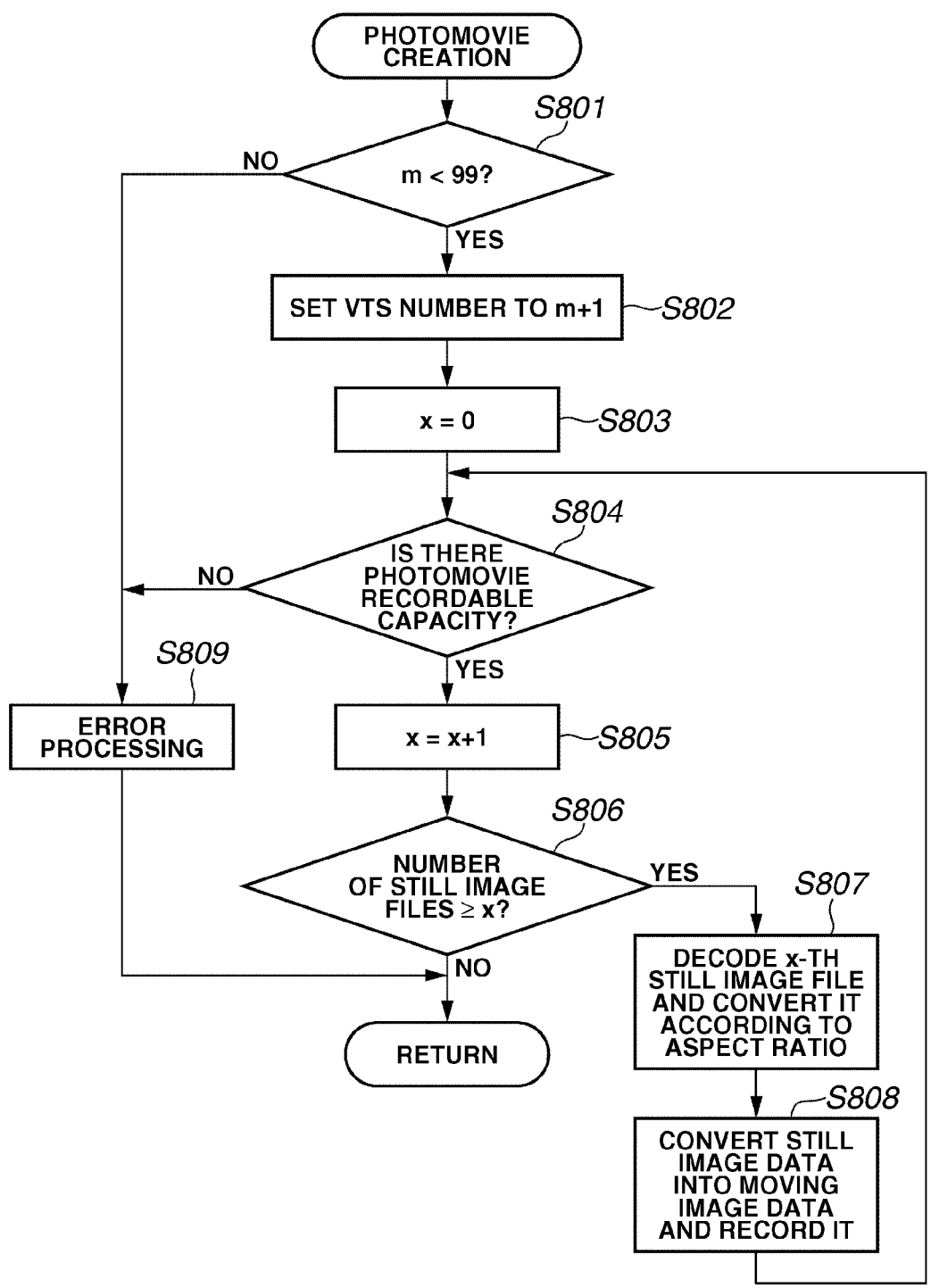
FIG. 8 is a flowchart showing an example of the photomovie generation processing.

FIG. 8 is a flowchart showing the photomovie generation processing in step S606 of FIG. 6.

First, in step S801, the CPU 102 determines whether the number m of VTSs recorded on the disk D is a maximum value, for example, "99". If it is determined that the number m is equal to or greater than the maximum value "99" (NO in step S801), as no more VTSs can be generated, the process proceeds to error processing in step S809. If it is determined that the number m of VTSs is less than the maximum value "99" (YES in step S801), the process proceeds to step S802. In step S802, the CPU 102 defines setting to generate a photomovie as VTS #m+1.

Then, in step S803, the CPU 102 initializes a number x indicating the number of processed still image files. In step S804, the CPU 102 determines whether a still image can be added to the VTS #m+1 based on a residual capacity of the disk D. If a result of the determination indicates inhibition of recording (NO in step S804), the process proceeds to error processing in step S809. If a result of the determination indicates that there is a sufficient residual capacity (YES in step S804), the CPU 102 increments the number x in step S805.

In step S806, the CPU 102 determines whether the number x of processed still image files is equal to or less than the number of all still image files recorded on the disk D. If a result of the determination indicates that the number x of processed still image files is larger than the number of all still image files (NO in step S806), as all of the still image files have been processed, the photomovie generation processing ends.

If a result of the determination indicates that the number x is equal to or less than the number of still image files (YES in step S806), the process proceeds to step S807. In step S807, the CPU 102 decode the x-th still image file. Further, the CPU 102 converts the size of the x-th still image according to the aspect ratio of that still image and the set aspect ratio. Then, in step S808, the CPU 102 converts still image data into moving image data (MPEG data) and records the moving image data on the disk D. Subsequently, the process returns to step S804.

In the error processing in step S809, the CPU 102 outputs an error message or the like to the display unit 126, indicating that the photomovie generation processing has not been finished normally. Then, the photomovie generation processing ends.

In the present exemplary embodiment, all of the still image files recorded on the disk D are converted and recorded. However, a user may convert and record only a preselected still image file.

The present exemplary embodiment has been described by way of an example where still image files are processed in the order of recording. However, a user may process the still image files in a preselected order. In reality, it is useful to test whether a photomovie can be normally generated based on the flowchart of FIG. 8, i.e., whether the process ends without executing error processing, before the photomovie is generated to be recorded on the disk D.

Now, the conversion and recording processing of a still image file in steps S807 and S808 of the flowchart of FIG. 8 will be described in detail.

The recorder control unit 121 reads out a still image file recorded on the disk D and outputs the still image file to the camera control unit 111. The camera control unit 111 decodes the received still image file with the JPEG codec 112 and outputs the decoded still image signal to the recorder control unit 121.

In this case, if the aspect ratio is set to 16:9 in step S604 of FIG. 6, the camera control unit 111 converts the decoded still image into an image signal having an aspect ratio of 16:9.

For example, the image 201 having an aspect ratio of 4:3 shown in FIG. 2 is padded with a black image uniformly on the left and right sides, and converted into an image 901 having an aspect ratio 16:9 shown in FIG. 9. The image 202 having an aspect ratio 16:9 shown in FIG. 2 is output as an image 902 having the same aspect ratio shown in FIG. 9.

On the other hand, if the aspect ratio of 4:3 is set in step S605 of FIG. 6, the camera control unit 111 converts the decoded still image into an image signal having an aspect ratio of 4:3.

For example, the image 201 having an aspect ratio of 4:3 shown in FIG. 2 is output as an image 911 having the same aspect ratio shown in FIG. 9. The image 202 having an aspect ratio 16:9 shown in FIG. 2 is padded with a black image uniformly on the top and bottom sides, and converted into an image 912 having an aspect ratio of 4:3 shown in FIG. 9.

The recorder control unit 121 encodes each still image signal thus converted and output from the camera control unit 111 as an I picture with the MPEG encoder 122.

Figure 10:
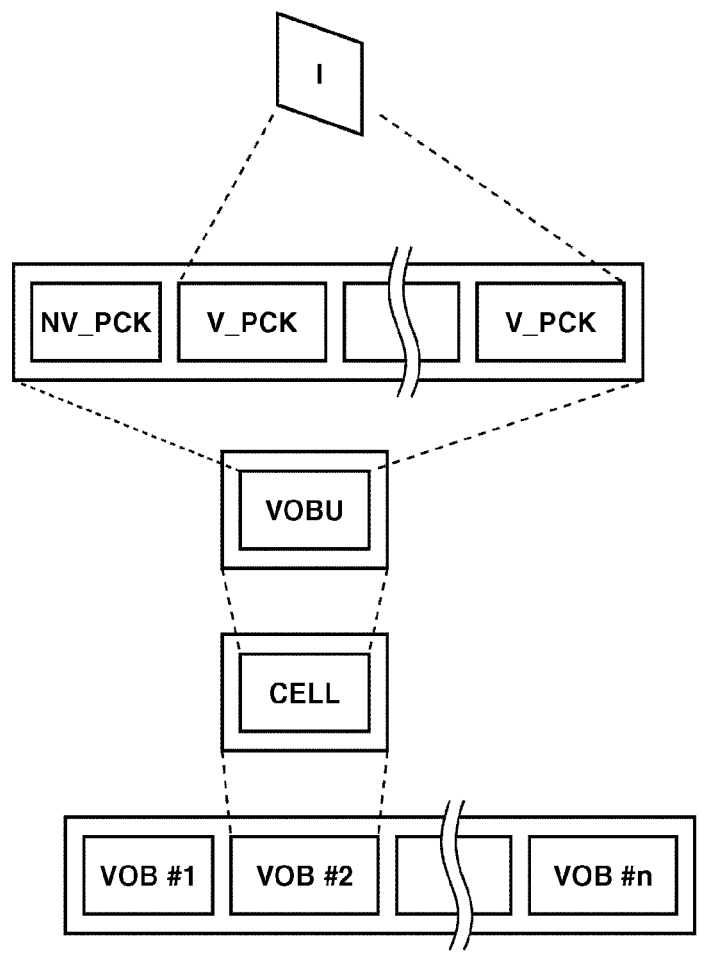
FIG. 10 is a diagram showing a exemplary structure of video data of a still image of the DVD-Video format.

As shown in FIG. 10, the recorder control unit 121 divides an I picture encoded by the MPEG encoder 122 into 2 KB Vide Pack Units (V_PCKs). Then, the recorder control unit 121 adds a 2 KB Navigation Pack Unit (NV_PCK), used for searching, to the V_PCKs to generate a Video Object Unit (VOBU).

The present exemplary embodiment is descried while omitting an Audio Pack Unit (A_PCK) as no sound is contained in the photomovie. In the case of including a sound, the A_PCK is added to the VOBU. Additionally, the recorder control unit 121 generates a CELL with one or more VOBUs. However, in the present exemplary embodiment, the recorder control unit 121 generates a CELL with one VOBU.

The recorder control unit 121 generates a Video Object (VOB) with one or more CELLs. However, in the present exemplary embodiment, the recorder control unit 121 generates a VOB with one CELL. Thus, the recorder control unit 121 generates a photomovie with VOBs obtained from respective still images, as shown in FIG. 11 described below.

Figure 11:
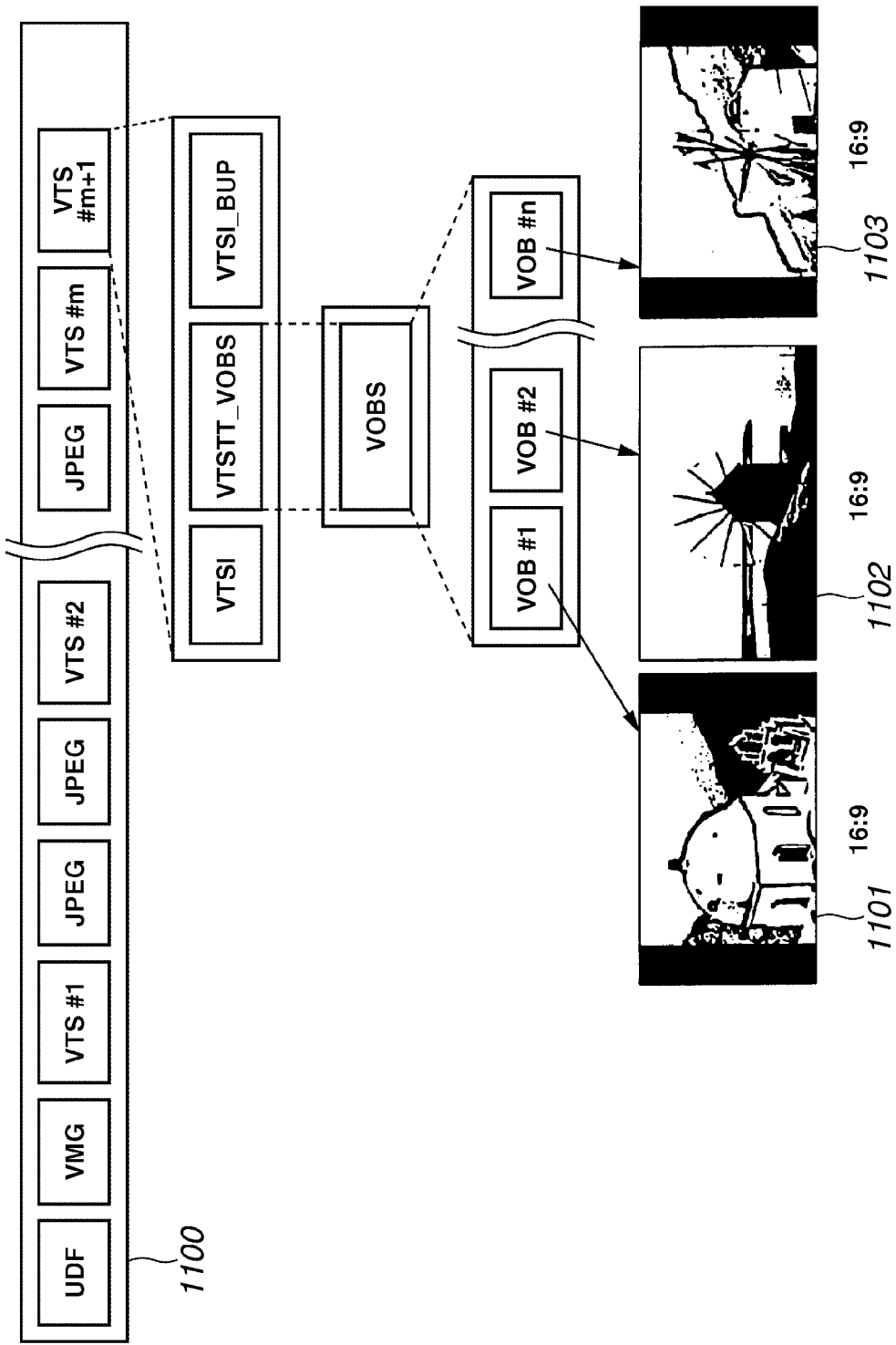
FIG. 11 is a diagram showing an example of recorded contents after the finalization processing and the photomovie generation processing.

FIG. 11 shows recorded contents 1100 of the disk D after the photomovie generation processing and the finalization processing are performed on the recorded contents 500 of the disk D shown in FIG. 5 with the aspect ratio set to 16:9.

In the photomovie generation processing, the still images 501 to 503 shown in FIG. 5 are converted by the camera control unit 111 and the recorder control unit 121 into image data 1101 to 1103 of MPEG I pictures, which respectively constitute VOB #1, VOB #2 and VOB #n.

The recorder control unit 121 generates a Video Object Set (VOBS) with these VOBs. If the size of the VOBS exceeds 1 GB, the VOBS is divided into 1 GB units to be recorded as continuously arranged UDF files on the disk D.

The VOBS thus generated is used as a Vide Object Set for Titles in a VTS (VTSTT_VOBS) constituting a VTS. In Video Title Set Information (VTSI) in the head of the VTS, management information regarding video data contained in the VTSTT_VOBS is recorded as a file.

The management information of the VTSI contains information on an aspect ratio used for reproducing video data of the VTSTT_VOBS. Thus, one of aspect ratios 16:9 and 4:3 is recorded.

In the present exemplary embodiment, the aspect ratio is set to 16:9 to generate a photomovie. Accordingly, the recorder control unit 121 records an aspect ratio of 16:9 in the VTSI.

The VTSI thus recorded, the VTSTT_VOBS, and a backup file of VTSI (VTSI_BUP) constitute a photomovie VTS #m+1. The photomovie VTS #m+1 is recorded on the disk D. In the finalization processing after the end of the photomovie generation processing, contents of the UDF and VMG areas of the disk D are recorded by the recorder control unit 121.

When the photomovie thus generated is displayed on a wide-screen television set, a display form can be changed according to the information on an aspect ratio. Thus, the images 1101 and 1103 are padded with black images of minimum necessary amounts on the left and right sides, and each object is displayed at an original aspect ratio. The entire image is displayed without being cropped. In the case of the image 1102, an object is displayed at an original aspect ratio. The entire image is displayed without being cropped.

Figure 12:
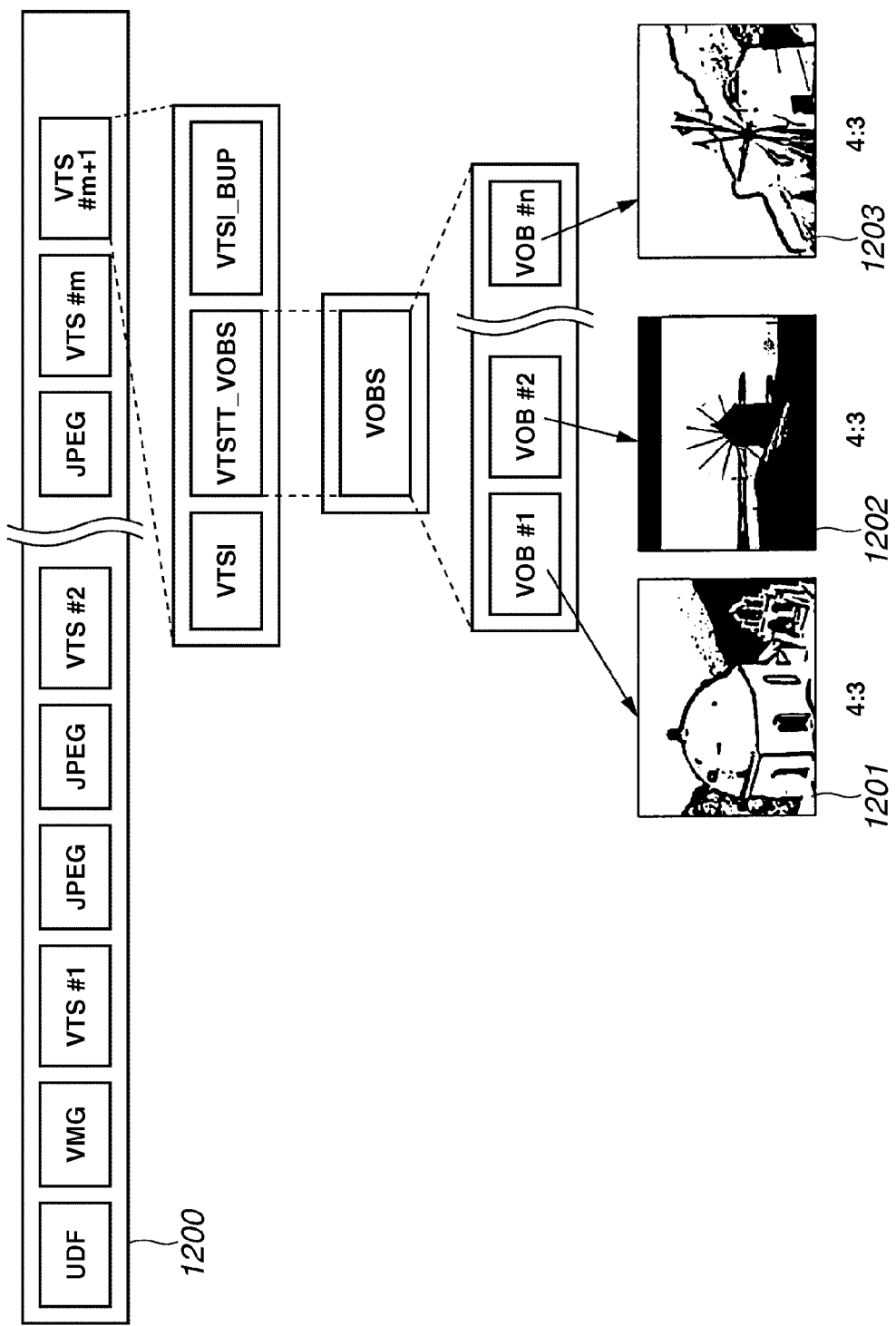
FIG. 12 is a diagram showing an example of recorded contents after the finalization processing and the photomovie generation processing.

FIG. 12 shows recorded contents of the disk D after the photomovie generation processing and the finalization processing are performed on the recorded contents of the disk D shown in FIG. 5 with the aspect ratio set to 4:3.

Differences from FIG. 11 are that MPEG I pictures are replaced by images 1201 to 1203 having an aspect ratio of 4:3, and the recorder control unit 121 records an aspect ratio of 4:3 in the VTSI.

When the photomovie thus generated is displayed on a television having an aspect ratio of 4:3, in the case of the images 1201 and 1203, each object is displayed at an original aspect ratio. The entire image is displayed without being cropped. The image 1202 is padded with a black image of a minimum necessary amount on the top and bottom sides, and an object is displayed at an original aspect ratio. The entire image is displayed without being cropped.

Thus, when generating a photomovie, a user only needs to select one of aspect ratios 16:9 and 4:3 according to a television monitor used for display.

In the present exemplary embodiment, a user selects one of 16:9 and 4:3 as an aspect ratio. However, another aspect ratio can be designated, and each still image data can be converted to have the designated aspect ratio.

Second Exemplary Embodiment according to a second exemplary embodiment, a video camera can generate photomovies having a plurality of aspect ratios.

Figure 13:
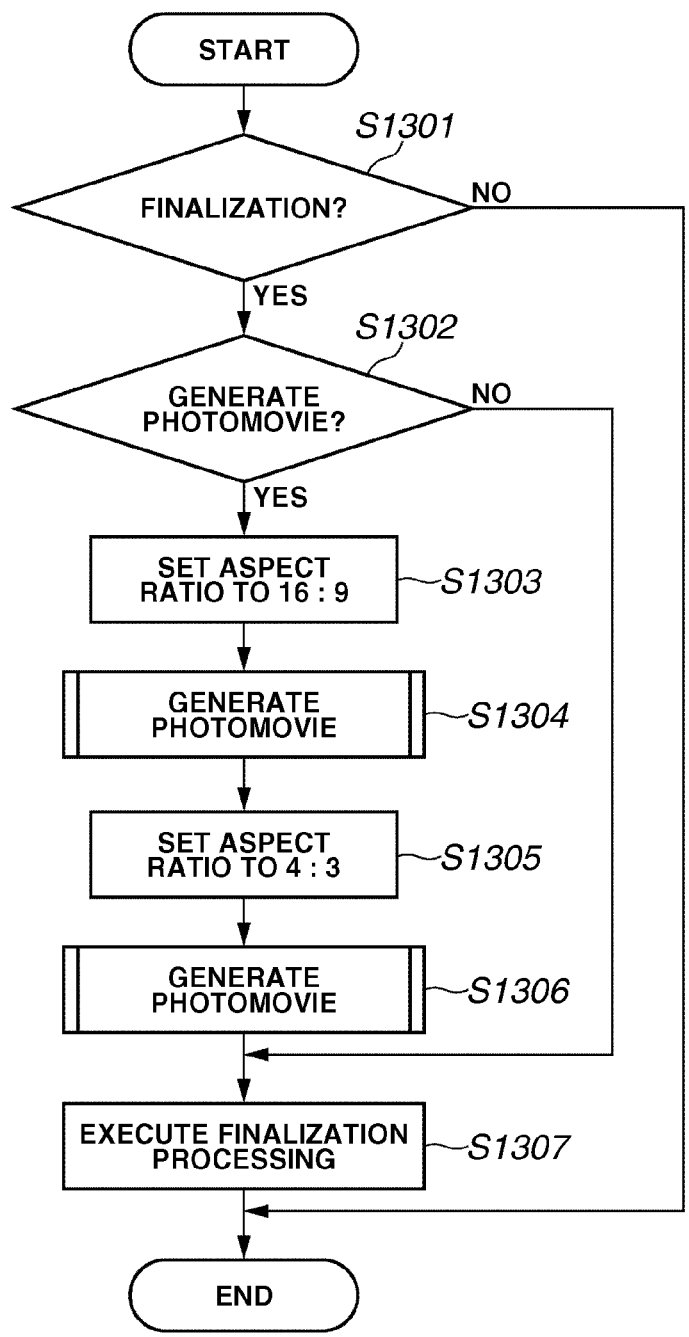
FIG. 13 is a flowchart showing an example of the finalization processing and the photomovie generation processing.

FIG. 13 is a flowchart showing finalization processing and photomovie generation processing according to the second exemplary embodiment.

First, in step S1301, the CPU 102 displays the screen 701 shown in FIG. 7 on the display unit 126 to enable a user to select execution/nonexecution of finalization processing. The CPU 102 obtains a user's selection result based on an operation state of the operation unit 105. The process proceeds to step S1302 if the finalization processing is instructed (YES in step S1301). If the finalization processing is not instructed (NO in step S1301), the process ends.

In step S1302, the CPU 102 displays the screen 702 shown in FIG. 7 on the display unit 126 to enable the user to select generation/nongeneration of a photomovie. The CPU 102 obtains a user's selection result based on an operation state of the operation unit 105. The process proceeds to step S1303 if the photomovie generation is instructed (YES in step S1302). If the photomovie generation is not instructed (NO in step S1302), the process proceeds to step S1307.

In step S1303, the CPU 102 sets the aspect ratio to 16:9. In step S1304, the CPU 102 generates a photomovie having an aspect ratio of 16:9. Then, in step S1305, the CPU 102 sets the aspect ratio to 4:3. In step S1306, the CPU 102 generates a photomovie having an aspect ratio of 4:3. In subsequent step S1307, the CPU 102 performs finalization processing. The process then ends.

Figure 14:
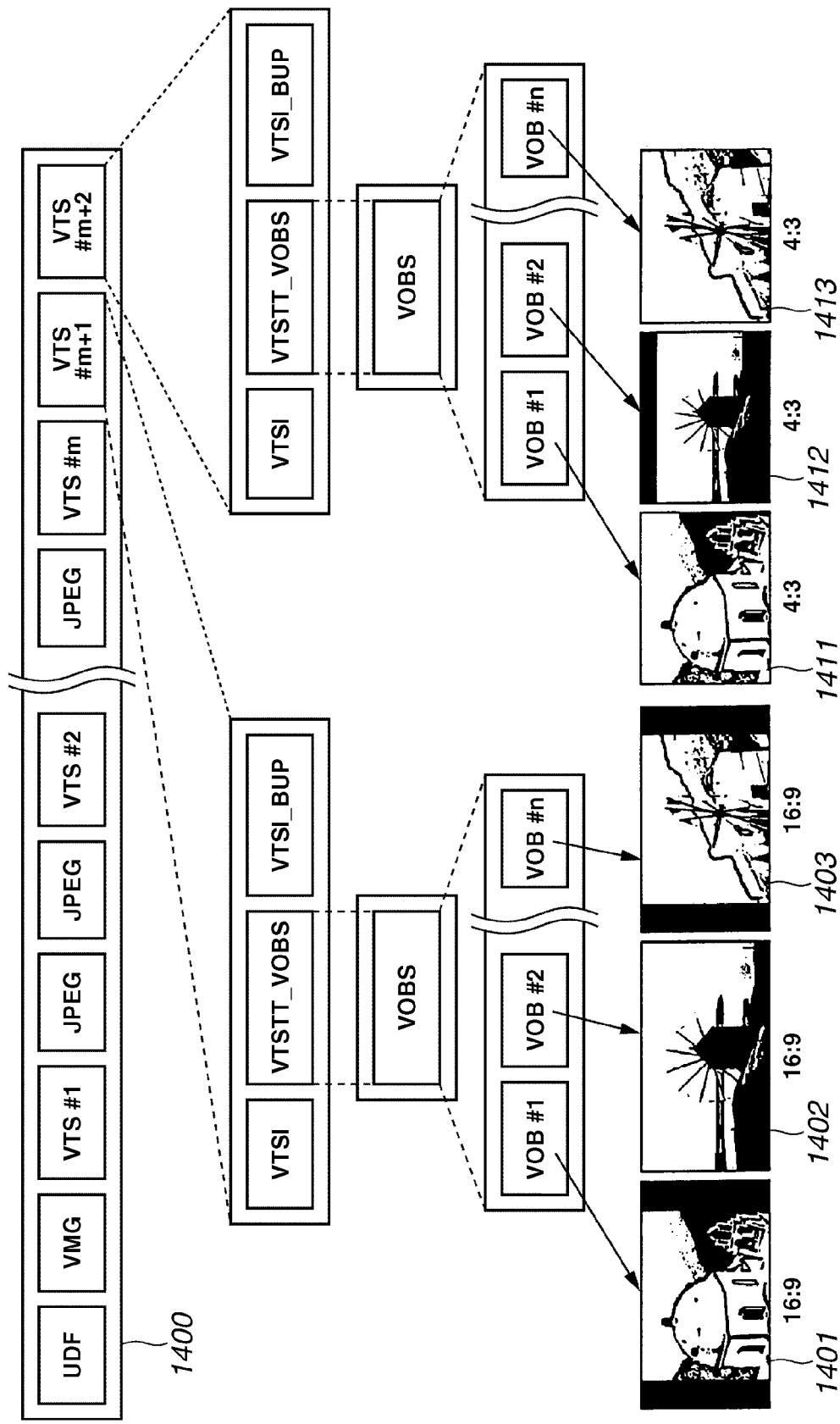
FIG. 14 is a diagram showing an example of recorded contents after the finalization processing and the photomovie generation processing.

FIG. 14 shows recorded contents 1400 of the disk D after photomovie generation processing for a plurality of aspect ratios and finalization processing are performed on the recorded contents 500 of the disk D shown in FIG. 5.

In the photomovie generation processing for an aspect ratio of 16:9, the still images 501 to 503 shown in FIG. 5 are converted into image data 1401 to 1403 of MPEG I pictures by the camera control unit 111 and the recorder control unit 121. The converted image data 1401 to 1404 respectively constitute VOB #1, VOB #2 and VOB #n.

The recorder control unit 121 generates a VOBS with these VOBs. When the size of the VOBS exceeds 1 GB, the VOBS is divided into 1 GB units to be recorded as continuously arranged UDF files on the disk D. The VOBS thus generated is used as a VTSTT_VOBS constituting a VTS. In a VTSI in the head of the VTS, management information regarding video data contained in the VTSTT_VOBS is recorded as a file.

The management information of the VTSI contains an aspect ratio used for reproducing video data of the VTSTT_VOBS. The recorder control unit 121 records an aspect ratio of 16:9 in the VTSI.

The VTSI thus recorded, the VTSTT_VOBS, and a VTSI_BUP as a backup file of VTSI constitute a first photomovie VTS #m+1. The first photomovie VTS #m+1 is recorded on the disk D.

Next, in the photomovie generation processing for an aspect ratio of 4:3, the still images 501 to 503 shown in FIG. 5 are converted into image data 1411 to 1413 of MPEG I pictures by the camera control unit 111 and the recorder control unit 121. Then, as in the case of the aspect ratio of 16:9, a second photomovie VTS #m+2 is generated and recorded on the disk D. After the end of the photomovie processing, in finalization processing, data of the UDF and VMG areas are recorded on the disk D by the recorder control unit 121.

When the photomovie having an aspect ratio of 16:9 thus generated is displayed on a wide-screen television set, the images 1401 and 1403 are padded with black images of minimum necessary amounts on the left and right sides, and each object is displayed at an original aspect ratio. The entire image is displayed without being cropped. In the case of the image 1402, an object is displayed at an original aspect ratio, and the entire image is displayed without being cropped.

When the photomovie having an aspect ratio of 4:3 thus generated is displayed on a television set having an aspect ratio of 4:3, in the case of the images 1411 and 1413, each object is displayed at an original aspect ratio. The entire image is displayed without being cropped. The image 1412 is padded with a black image of a minimum necessary amount on the top and bottom sides, and an object is displayed at an original aspect ratio. The entire image is displayed without being cropped.

According to the present exemplary embodiment, both of the photomovies having respective aspect ratios of 4:3 and 16:9 are generated. Thus, a user can select a photomovie to be reproduced according to a television monitor used for display.

Third Exemplary Embodiment

A third exemplary embodiment is directed to generating a new photomovie each time the aspect ratio of a still image is switched.

Figure 15:
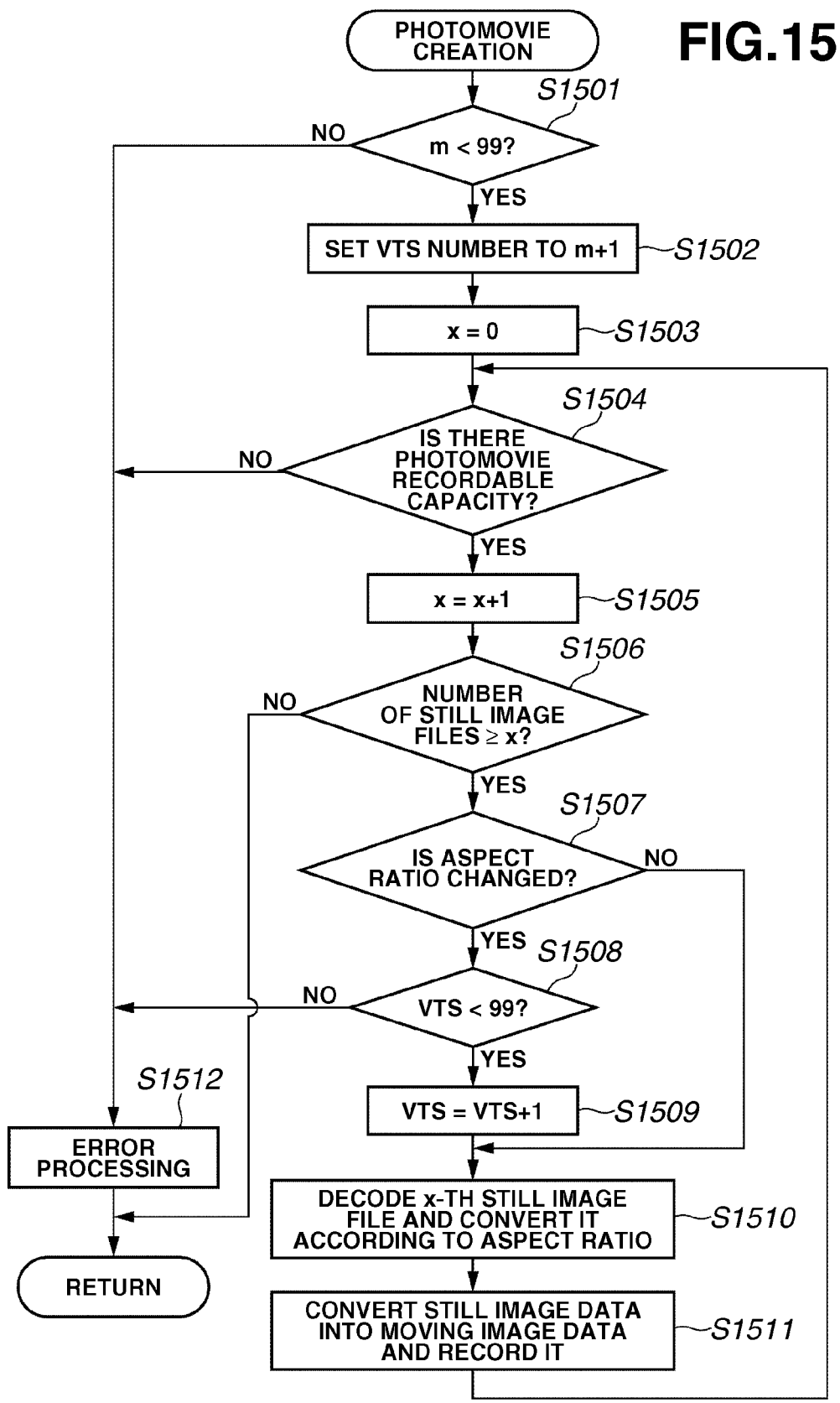
FIG. 15 is a flowchart showing an example of the photomovie generation processing.

FIG. 15 is a flowchart showing photomovie generation processing according to the third exemplary embodiment.

First, in step S1501, the CPU 102 determines whether the number m of VTSs recorded on the disk D is a maximum value, for example, "99". If a result of the determination indicates that the number m is equal to or greater than the maximum value "99" (NO in step S1501), as no more VTSs can be generated, the process proceeds to error processing in step S1512.

If a result of the determination indicates that the number m of VTSs is less than the maximum value "99" (YES in step S1501), the process proceeds to step S1502. In step S1502, the CPU 102 sets a number of a VTS generated as a photomovie to "m+1". Then, in step S1503, the CPU 102 sets a number x indicating the number of processed still image files to "0".

Next, in step S1504, the CPU 102 determines whether the photomovie can be recorded based on a residual capacity of the disk D. If a result of the determination indicates that the residual capacity of the disk D is not sufficient (NO in step S1504), the process proceeds to step S1512. If a result of the determination indicates that there is a sufficient residual capacity (YES in step S1504), the CPU 102 increments the number x in step S1505. Then, in step S1506, the CPU 102 determines whether the number x of processed still image files is equal to or less than the number of all still image files recorded on the disk D.

If a result of the determination indicates that the number x of processed still image files is larger than the number of all still image files, as all of the still image files have been processed (NO in step S1506), the photomovie generation processing ends. On the other hand, if a result of the determination indicates that the number x is equal to or less than the number of still image files (YES in step S1506), the process proceeds to step S1507. In step S1507, the CPU 102 determines whether aspect ratios of the x-th still image file and the (x−1)-th still image file are different from each other in a still image file other than the first still image file. The process proceeds to step S1508 if the aspect ratio has been changed (YES in step S1507), and to step S1510 if the aspect ratio has not been changed (NO in step S1507).

In step S1508, the CPU 102 determines whether a number of a currently generated VTS is smaller than the maximum value, for example, "99". If the number of the VTS is equal to or greater than the maximum value "99" (NO in step S1508), as no more VTSs can be generated, the process proceeds to error processing in step S1512. If the number of the VTS is less than the maximum value "99" (YES in step S1507), the process proceeds to step S1509. In step S1509, the CPU 102 closes the current VTS and increments the VTS number to generate a new VTS.

In step S1510, the CPU 102 decodes a still image recorded x-th and converts its size. In step S1511, the CPU 102 converts the decoded still image data into moving image data and records the moving image data on the disk D. Then, the process returns to step S1504.

In the error processing in step S1512, the CPU 102 outputs a message indicating that the photomovie generation processing has not been finished normally to the display unit 126. The photomovie generation processing then ends.

Figure 16:
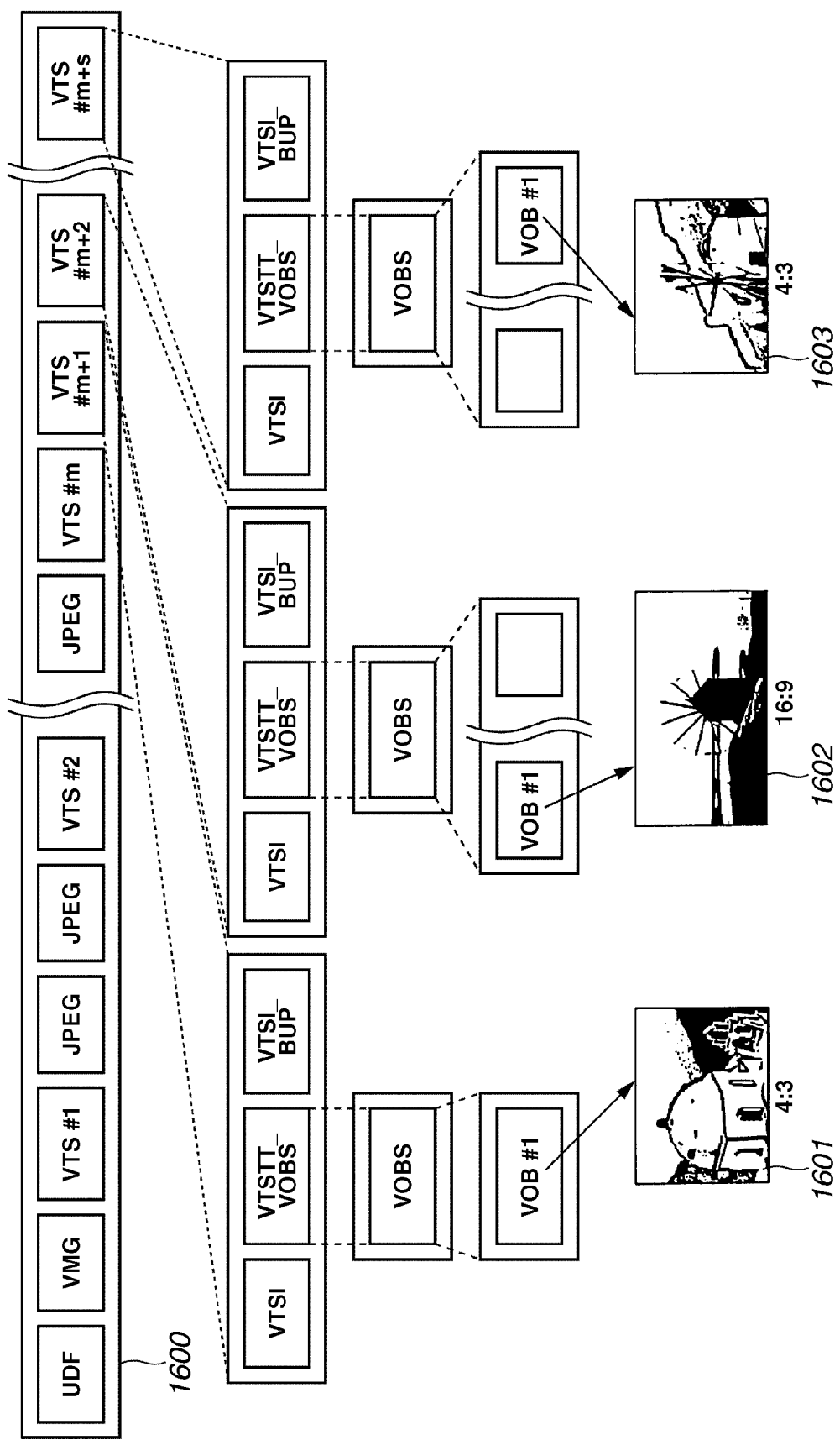
FIG. 16 is a diagram showing an example of recorded contents after the finalization processing and the photomovie generation processing.

FIG. 16 shows recorded contents 1600 of the disk D after photomovie generation processing and finalization processing are performed on the recorded contents 500 of the disk D shown in FIG. 5. The still image 501 shown in FIG. 5 is converted into an image 1601 of an MPEG I picture by the camera control unit 111 and the recorder control unit 121 to constitute VOB #1.

The recorder control unit 121 generates a VOBS with this VOB. When the size of the VOBS exceeds 1 GB, the VOBS is divided into 1 GB units to be recorded as continuously arranged UDF files on the disk D. The VOBS thus generated is used as a VTSTT_VOBS constituting a VTS.

In a VTSI in the head of the VTS, management information regarding video data contained in the VTSTT_VOBS is recorded as a file. The management information of the VTSI contains information on an aspect ratio used for reproducing video data of the VTSTT_VOBS. The recorder control unit 121 records an aspect ratio of 4:3 in the VTSI.

The VTSI thus recorded, the VTSTT_VOBS, and a VTSI_BUP which is a backup file of VTSI constitute a first photomovie VTS #m+1. The first photomovie VTS #m+1 is recorded on the disk D.

Since the aspect ratio of the still image 502 shown in FIG. 5 is different from that of the previous still image 501, the CPU 102 generates a VOB #1 contained in a second photomovie VTS #m+2. In this case, the recorder control unit 121 records an aspect ratio of 16:9 in the VTSI of the VTS #m+2. Further, since the aspect ratio of the still image 503 shown in FIG. 5 is different from at least that of the still image 502, the CPU 102 generates a last VOB #1 contained in a last photomovie VTS #m+s.

In this case, the recorder control unit 121 records an aspect ratio of 4:3 in the VTSI of the VTS #m+s. After the photomovie generation processing, in finalization processing, the recorder control unit 121 records data in the UDF and VMG areas of the disk D.

When the photomovie thus generated is displayed on a wide-screen television set, the images 1601 and 1603 are reproduced as video data having an aspect ratio of 4:3. As a result, the images 1601 and 1603 are padded with black images of minimum necessary amounts on the left and right sides, and each object is displayed at an original aspect ratio. The entire image is displayed without being cropped.

The mage 1602 is reproduced as video data having an aspect ratio of 16:9. As a result, an object is displayed at an original aspect ratio. The entire image is displayed without being cropped.

When the photomovie thus generated is displayed on a television set having an aspect ratio of 4:3, the images 1601 and 1603 are reproduced as video data having an aspect ratio of 4:3. As a result, an object is displayed at an original aspect ratio. The entire image is displayed without being cropped.

The image 1602 is reproduced as video data having an aspect ratio of 16:9. As a result, the image 1602 is padded with a black image of a minimum necessary amount on the top and bottom sides, and an object is displayed at an original aspect ratio. The entire image is displayed without being cropped.

Fourth Exemplary Embodiment

A fourth exemplary embodiment is directed to generating a photomovie from a still image file recorded on the disk D logically formatted according to the VR format.

Figure 17:
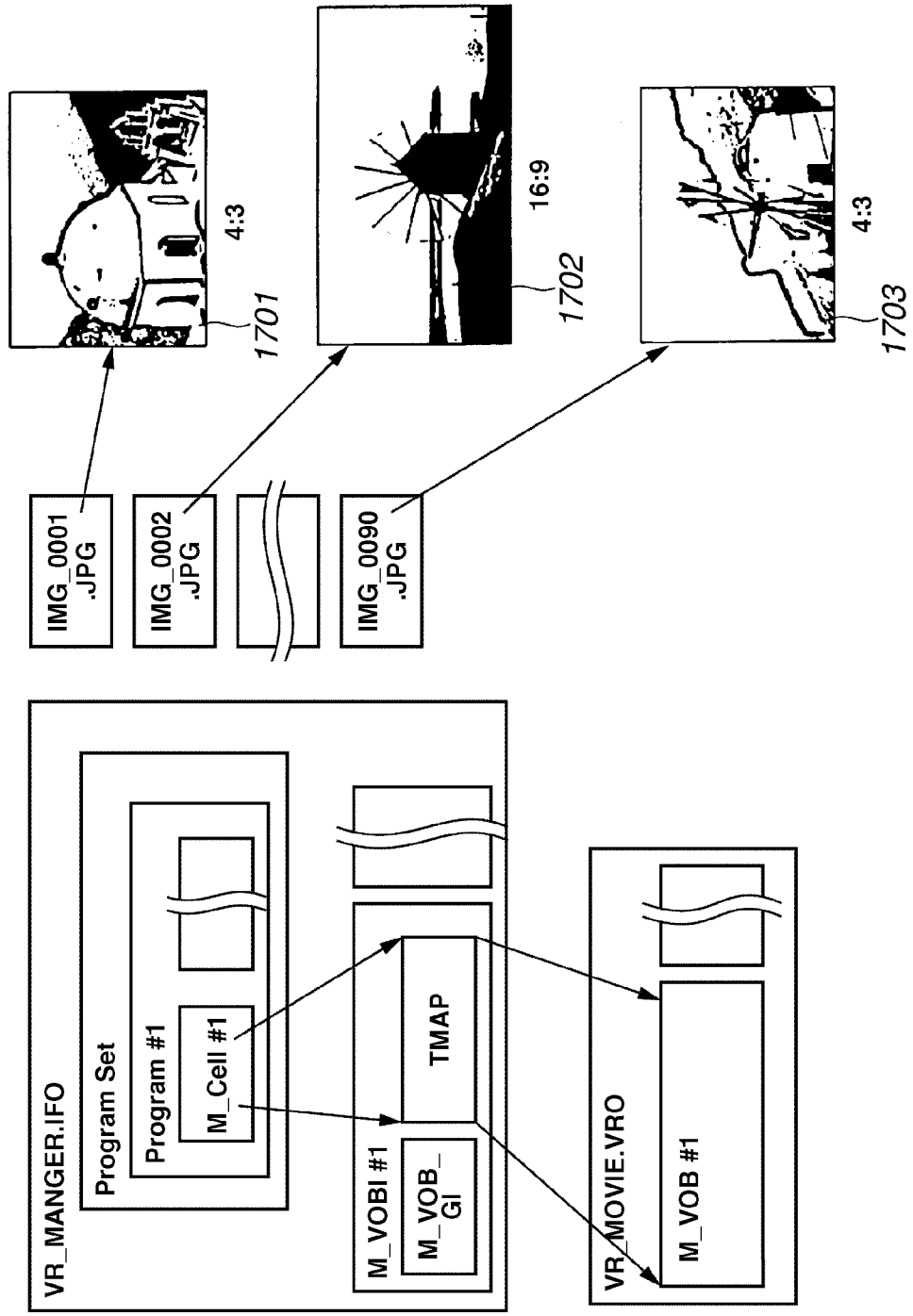
FIG. 17 is a diagram showing an example of recorded contents before photomovie generation processing of a DVD of the VR format.
Figure 18:
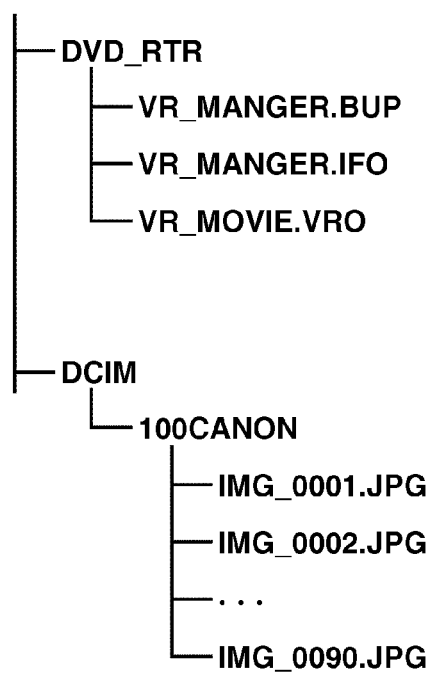
FIG. 18 is a diagram showing an exemplary folder structure before the photomovie generation processing of the DVD of the VR format.

FIG. 17 shows recorded contents of a DVD before finalization processing. FIG. 18 shows a folder structure of the DVD in this case. As an example, it is presumed that 90 still image files are recorded on the DVD. The disk D is logically formatted according to the VR format, on which moving image data and still image data are recorded.

According to the present exemplary embodiment, moving image is recorded according to the VR format. The recorded moving image data includes a VMG file VR_MANAGER.IFO for managing all video data of a DVD_RTR folder, its backup file VR_MANAGER.BUP, and a moving image video file VR_MOVIE.VRO.

Still images 1701 to 1703 are recorded as UDF still image files IMG_0001.JPG, IMG_0002.JPG, and IMG_0090.JPG, respectively. Information on these still image files is not managed by the VMG. conventional DVD video players cannot reproduce the still image files as they reproduce only video data managed by the VMG.

Figure 19:
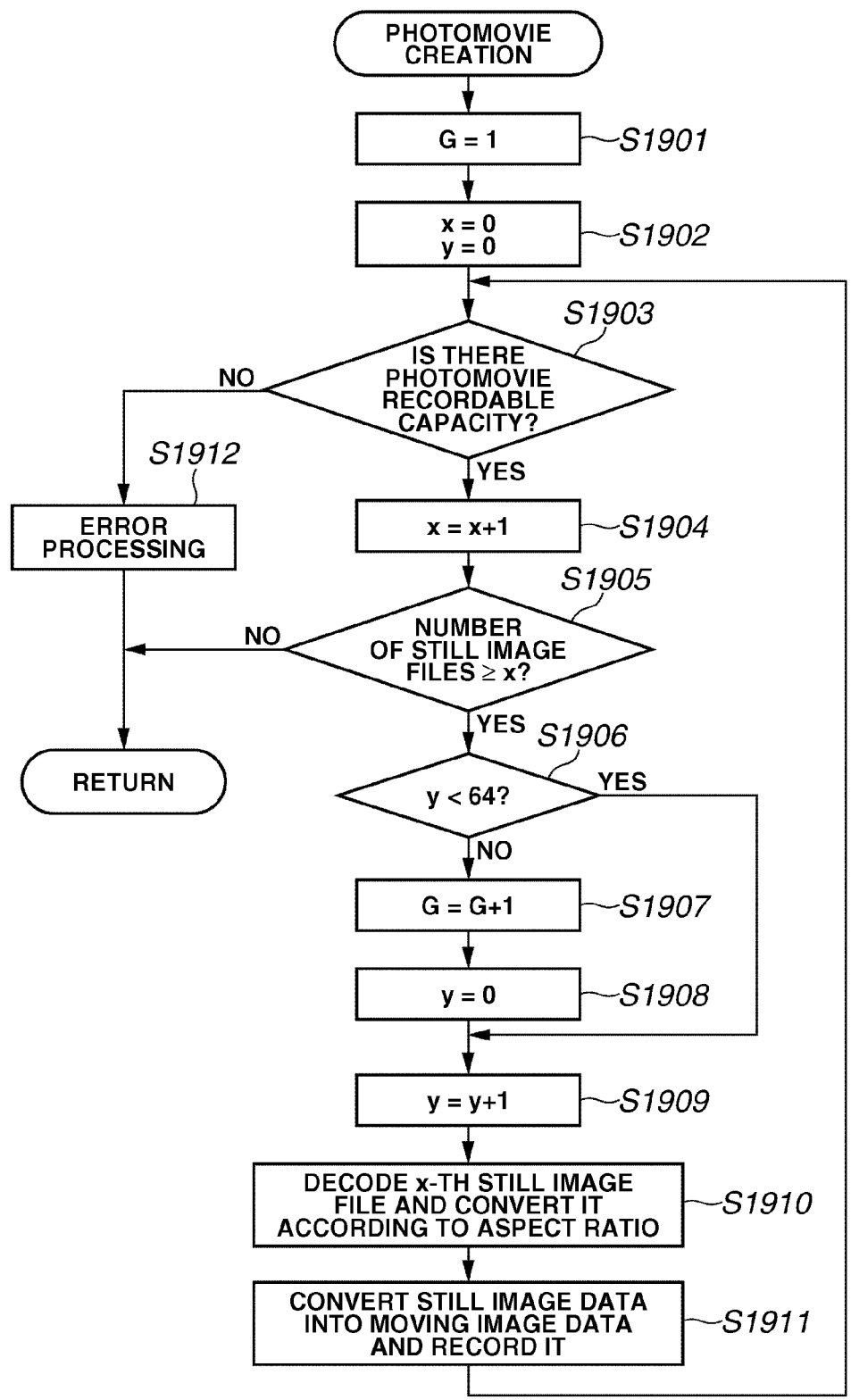
FIG. 19 is a flowchart showing an example of the photomovie generation processing.

FIG. 19 is a flowchart showing photomovie generation processing according to the fourth exemplary embodiment.

First, in step S1901, the CPU 102 initializes a group number G.

Then, in step S1902, the CPU 102 initializes a number x indicating the number of processed still image files and a number y indicating the number of still images recorded in the group G. In step S1903, the CPU 102 determines whether a photomovie can be recorded on the disk D based on a recording residual capacity of the disk D.

If a result of the determination indicates that the residual capacity of the disk D is not sufficient (NO in step S1903), the process proceeds to error processing in step S1912. If the residual capacity is sufficient (YES in step S1903), the CPU 102 increments the number x in step S1904. In step S1905, the CPU 102 determines whether the number x of processed still image files is equal to or less than the number of all still image files recorded on the disk D.

If a result of the determination indicates that the number x is larger than that of all still image files (NO in step S1905), the photomovie generation processing ends as all of the still image files have been processed.

If the number x is equal to or less than the number of still image files (YES in step S1905), the process proceeds to step S1906. In step S1906, the CPU 102 determines whether the number y of still image files recorded in the group G is less than "64".

The process proceeds to step S1909 if a result of the determination indicates that the number y of still image files is less than "64" (YES in step S1906). If the number y is equal to or larger than "64" (NO in step S1906), the process proceeds to step S1907. In step S1907, the CPU 102 increments the group number G. In step S1908, the CPU 102 initializes the number y of still image files.

In step S1909, the CPU 102 increments the number y of recorded still image files. In step S1910, the CPU 102 decodes the x-th recorded still image file and converts the size of the decoded still image according to a set aspect ratio. Then, in step S1911, the CPU 102 converts the still image data into moving image data and records the moving image data on the disk D. The process then returns to step S1903.

In error processing in step S1912, the CPU 102 displays a message indicating that photomovie generation processing has not been finished normally on the display unit 126. Then, the photomovie generation processing ends.

Now, the conversion and recording processing in steps S1910 and S1911 will be described in detail.

The recorder control unit 121 shown in FIG. 1 reads out a still image file recorded on the disk D and outputs the still image file to the camera control unit 111. The camera control unit 111 decodes the received still image file with the JPEG codec 112. Then, the camera control unit 111 converts the decoded still image according to a set aspect ratio and outputs the converted still image signal to the recorder control unit 121. The recorder control unit 121 encodes the received image signal as an I picture with the MPEG encoder 122.

In this case, if the aspect ratio is set to 16:9 in step S604 of FIG. 6, the image signal output from the camera control unit 111 is an image signal having an aspect ratio of 16:9.

For example, the image 201 having an aspect ratio of 4:3 shown in FIG. 2 is padded with a black image uniformly on the left and right sides, and converted into an image 901 having an aspect ratio of 16:9 shown in FIG. 9. The image 202 having an aspect ratio of 16:9 shown in FIG. 2 is output as an image 902 having the same aspect ratio shown in FIG. 9.

On the other hand, if the aspect ratio is set to 4:3 in step S605 of FIG. 6, the image signal output from the camera control unit 111 is an image signal having an aspect ratio of 4:3.

For example, the image 201 having an aspect ratio of 4:3 shown in FIG. 2 is output as an image 911 having the same aspect ratio shown in FIG. 9. The image 202 having an aspect ratio of 16:9 shown in FIG. 2 is padded with a black image uniformly on the top and bottom sides, and converted into an image 912 having an aspect ratio of 4:3 shown in FIG. 9.

In the VR format, a still image can also be recorded as video data. Thus, unlike the first exemplary embodiment which is directed to the DVD-Video format, the CPU 102 converts a still image file encoded according to the JPEG coding method into video data of a still image to generate a photomovie.

Figure 20:
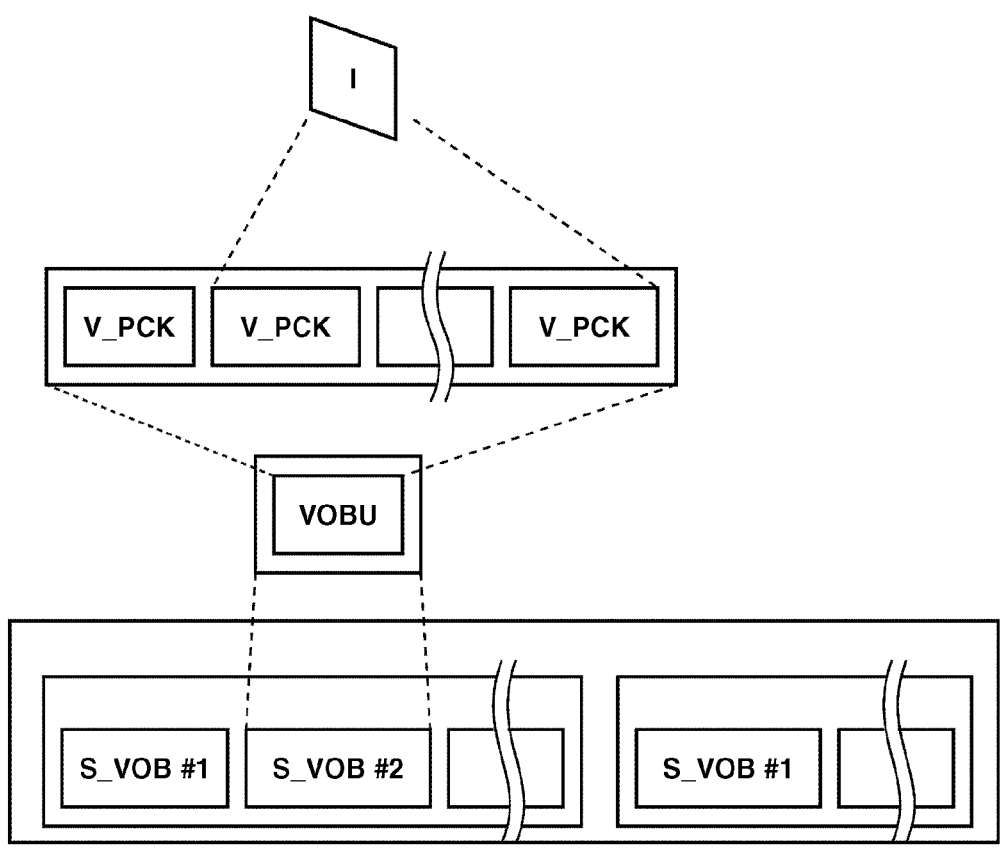
FIG. 20 is a diagram showing an example of video data of a still image of the VR format.

The recorder control unit 121 divides the I picture encoded by the MPEG encoder 122 into 2 KB V_PCKs to generate a VOBU, as shown in FIG. 20. According to the present exemplary embodiment, as no sound is contained in a photomovie, a description of an A_PCK is omitted. However, if a sound is included, the A_PCK is added to the VOBU.

Further, the recorder control unit 121 generates a Still Picture VOB (S_VOB) with one or more VOBUs. According to the present exemplary embodiment, however, the recorder control unit 121 generates an S_VOB with one VOBU. The recorder control unit 121 generates a photomovie with S_VOBs thus obtained from still images, as shown in FIG. 21.

Figure 21:
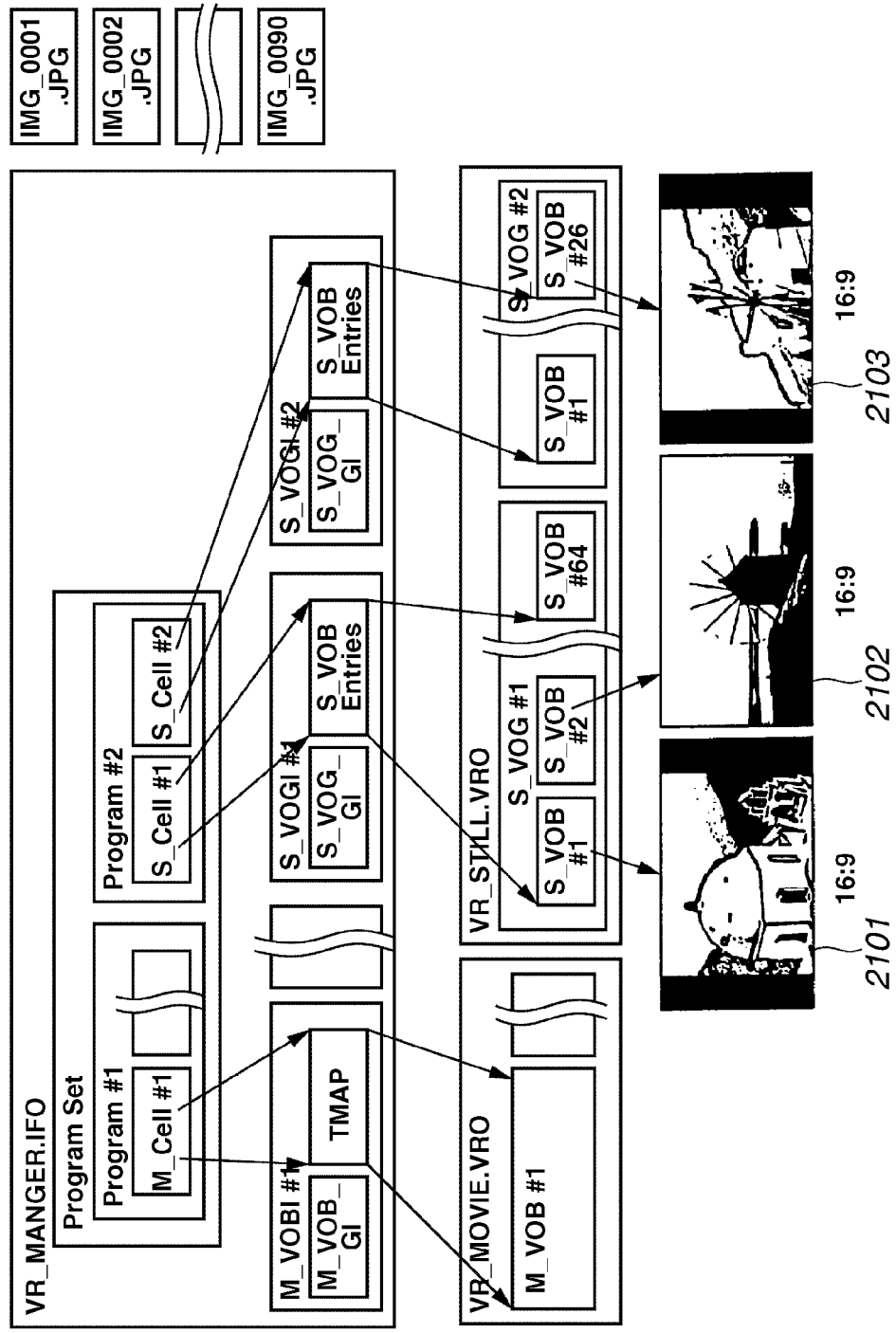
FIG. 21 is a diagram showing an example of recorded contents after photomovie generation processing for an aspect ratio 16:9.
Figure 22:
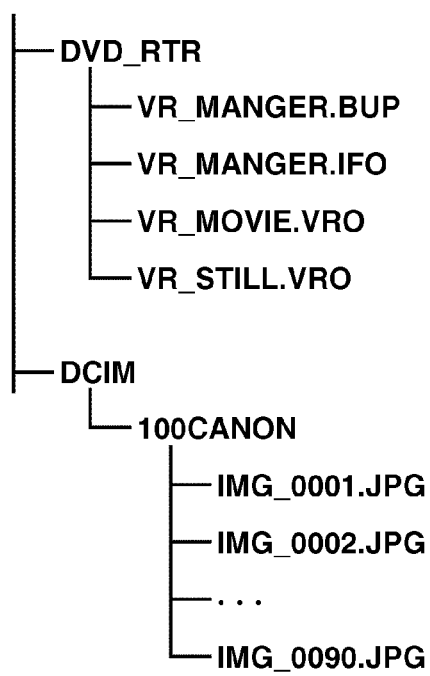
FIG. 22 is a diagram showing an exemplary folder structure after the photomovie generation processing.

FIG. 21 shows recorded contents 1100 of the disk D after the photomovie generation processing and the finalization processing are performed on the recorded contents of the disk D shown in FIG. 17 with the aspect ratio set to 16:9. FIG. 22 shows a folder structure of the disk D in this case.

In the photomovie generation processing, the still images 1701 to 1703 shown in FIG. 17 are converted by the camera control unit 111 and the recorder control unit 121 into image data 2101 to 2103 of MPEG I pictures, which respectively constitute S_VOB #1 and S_VOB #2 of a first group and S_VOB #26 of a second group.

The recorder control unit 121 generates a still image group S_VOG (Still Picture Video Object Group) grouped for every a maximum of 64 S_VOBs. The recorder control unit 121 then records a still image video file VR_STILL.VRO including all S_VOGs as a UDF file on the disk D.

The recorder control unit 121 also records management information S_VOGI (S_VOG Information) of each S_VOG in a VMG file.

The S_VOGI includes S_VOG attribute information S_VOG_GI (S_VOG Generation Information) and filter information S_VOB Entries for converting a still image number and an address in a group. The S_VOG_GI includes a number of S_VOB stream information S_VOB_STI (contained in VR_MANAGER.IFO but not shown). The S_VOB_STI contains an aspect ratio used for reproducing a still image in a group, including one of aspect ratios 16:9 and 4:3.

In the case shown in FIG. 21, as the an aspect ratio is set to 16:9 to generate a photomovie, the recorder control unit 121 sets an aspect ratio of 16:9 to record it in S_VOB_STIs of all S_VOGIs.

The recorder control unit 121 adds management information Program #2 for referring to video data of the generated still image to management information Program Set contained in a VMG file for referring to all the video data contained in the DVD. The Program is formed by integrating a plurality of S_Cells (Still Picture Cells). Numbers of a head still image and an end still image of a corresponding still image group are stored in the S_Cell. With these still image numbers passed through a filter of the S_VOB Entries contained in the S_VOGI, each still image can be reproduced.

When the photomovie thus generated is displayed on a wide-screen television set, images 2101 and 2103 shown in FIG. 21 are padded with black images of necessary minimum amounts on the left and right sides, and each object is displayed at an original aspect ratio. The entire image is displayed without being cropped. In the case of an image 2102, an object is displayed at an original aspect ratio, and the entire image is displayed without being cropped.

Figure 23:
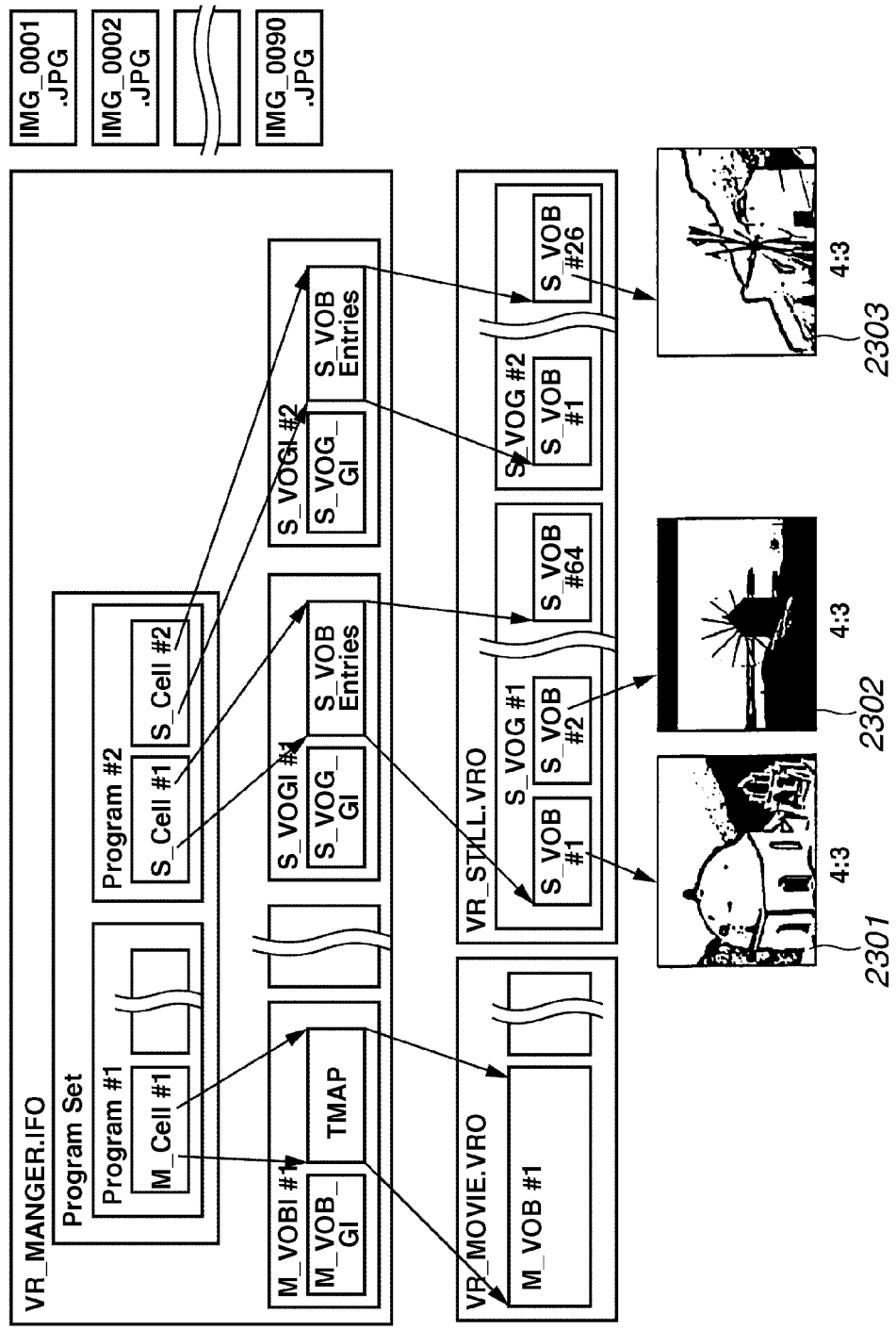
FIG. 23 is a diagram showing an example of recorded contents after photomovie generation processing for an aspect ratio of 4:3.

FIG. 23 shows recorded contents of the disk D after photomovie generation processing and finalization processing are performed on the recorded contents of the disk D shown in FIG. 17 with the aspect ratio set to 4:3.

Differences from FIG. 21 are that MPEG I pictures are replaced by images 2301 to 12303 having an aspect ratio of 4:3, and the recorder control unit 121 records an aspect ratio of 4:3 in all the S_VOB_STI.

When the photomovie thus generated is displayed on a television set having an aspect ratio of 4:3, in the case of the images 2301 and 2303, an object is displayed at an original aspect ratio. The entire image is displayed without being cropped. The image 2302 is padded with a black image of a minimum necessary amount on the top and bottom sides, and an object is displayed at an original aspect ratio. The entire image is displayed without being cropped.

Fifth Exemplary Embodiment

A video camera according to a fifth exemplary embodiment is different from that of the fourth exemplary embodiment in that a group of still images is set to generate a photomovie in a portion where the aspect ratio of a still image is switched.

Figure 24:
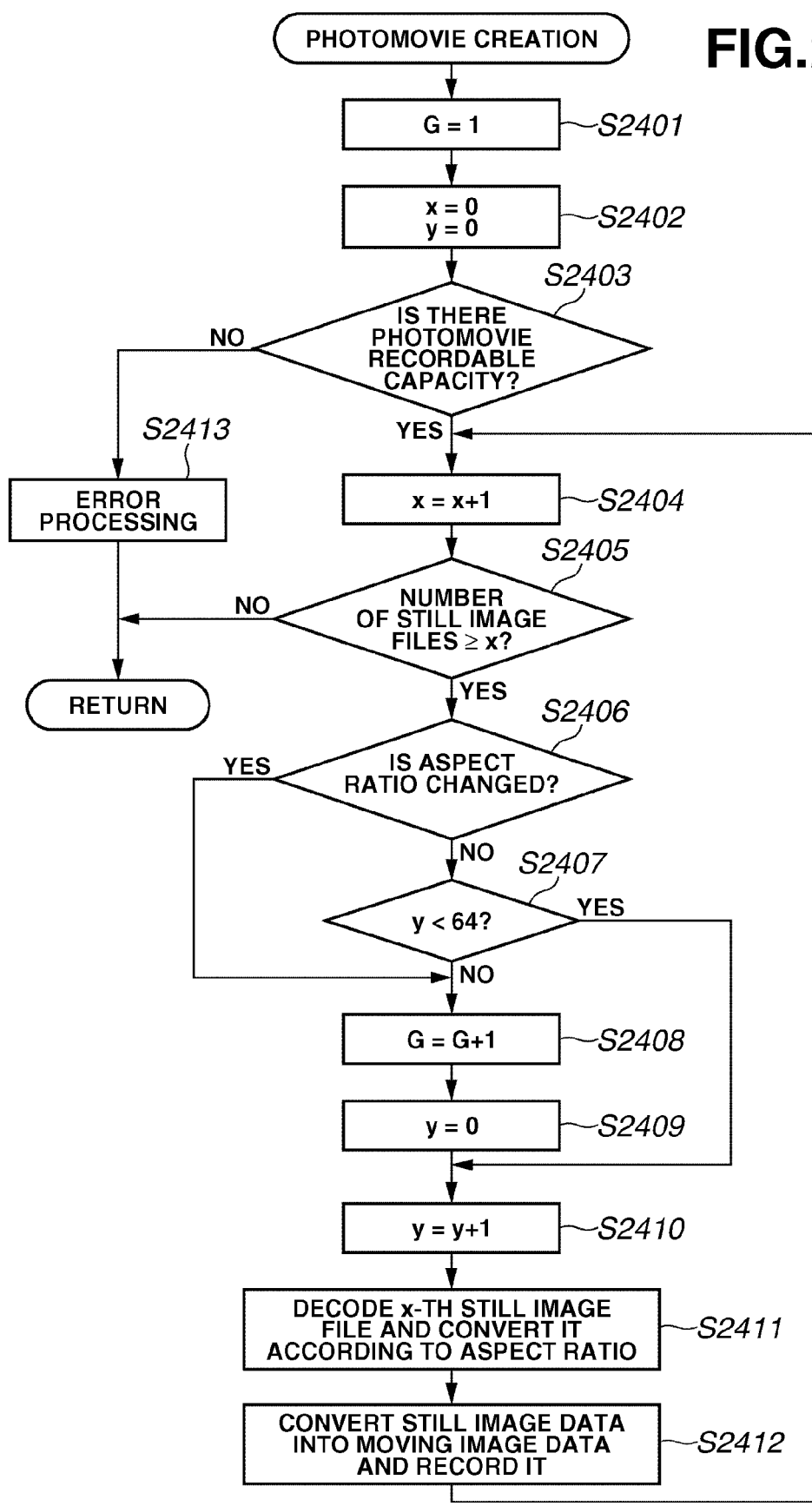
FIG. 24 is a flowchart showing an example of the photomovie generation processing.

FIG. 24 is a flowchart showing photomovie generation processing according to the fifth exemplary embodiment.

First, in step S2401, the CPU 202 initializes a group number G.

Then, in step S2402, the CPU 202 initializes a number x indicating the number of processed still image files and a number y indicating the number of still images recorded in the group G. In step S2403, the CPU 102 determines whether a photomovie can be recorded on the disk D based on a recording residual capacity of the disk D.

If a result of the determination indicates that the residual capacity of the disk D is not sufficient (NO in step S2403), the process proceeds to error processing in step S2413. If the residual capacity is sufficient (YES in step S2403), the CPU 202 increments the number x in step S2404. In step S2405, the CPU 102 determines whether the number x of processed still image files is equal to or less than the number of all still image files recorded on the disk D.

If a result of the determination indicates that the number x is lager than that of all still image files (NO in step S2405), the photomovie generation processing ends as all of the still image files have been processed.

If the number x is equal to or less than the number of still image files (YES in step S2405), the process proceeds to step S2406. In step S2406, the CPU 102 determines whether aspect ratios of the x-th and (x−1)-th still image files are different from each other in a still image file other than the first still image file. If there has been a change in aspect ratio (YES in step S2406), the process proceeds to step S2408 to change a group. If there has been no change in aspect ratio (NO in step S2406), the process proceeds to step S2407.

In step S2407, the CPU 102 determines whether the number y of still image files recorded in the group G is less than "64".

The process proceeds to step S2410 if a result of the determination indicates that the number y of still image files is less than "64" (YES in step S2407). If the number y is equal to or larger than "64", the process proceeds to step S2408 to increment the group number G. In step S2409, the CPU 102 initializes the number y of still image files.

In step S2410, the CPU 102 increments the number y of recorded still image files. In step S2411, the CPU 102 decodes the x-th recorded still image file. Then, the CPU 102 converts the size of the decoded still image according to a set aspect ratio. In step S2412, the CPU 102 converts the still image data into moving image data and records the moving image data on the disk D. Then, the process returns to step S2404.

In error processing in step S2413, the CPU 102 displays a message indicating that photomovie generation processing has not been finished normally on the display unit 126. The photomovie generation processing then ends.

Figure 25:
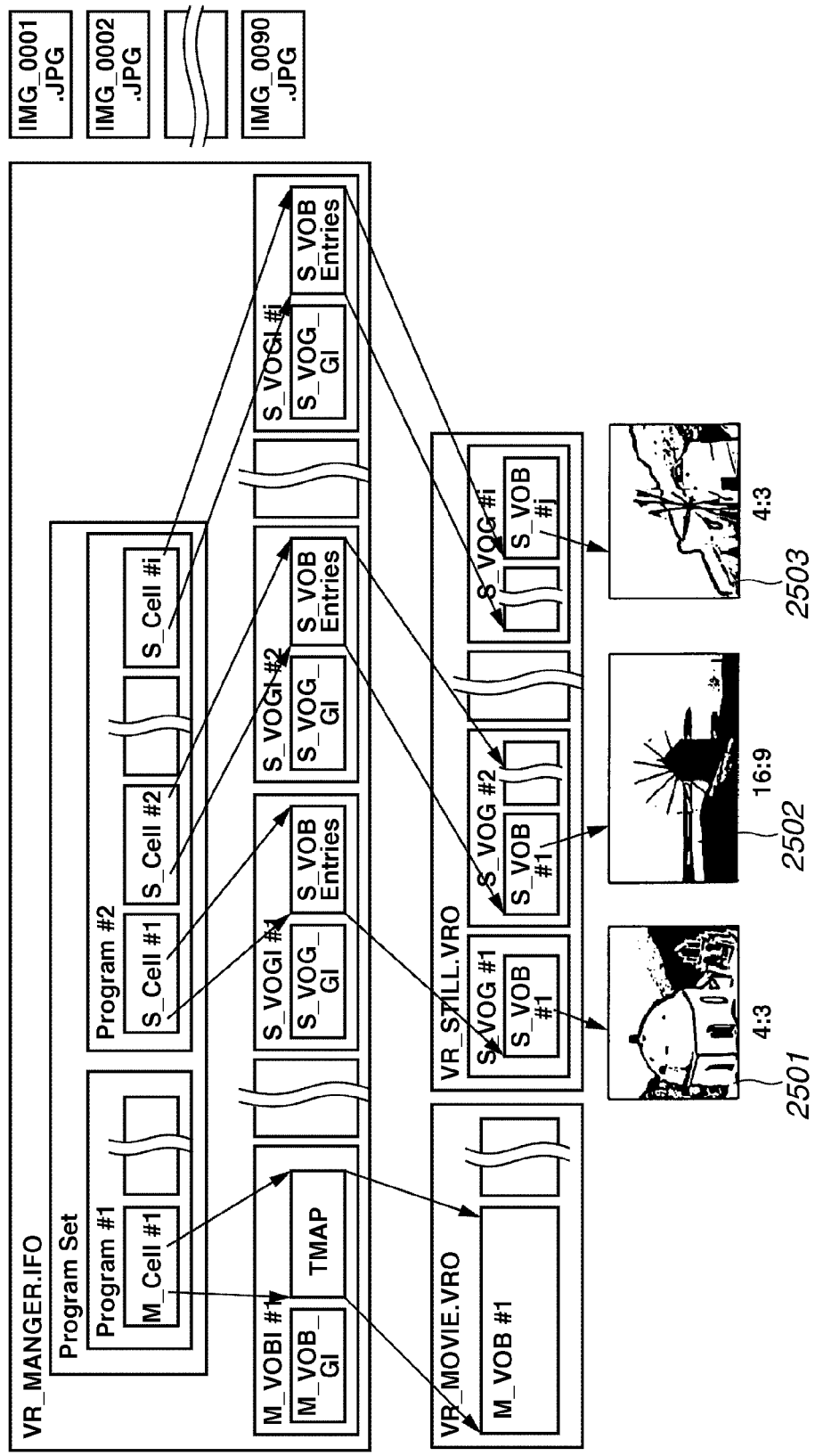
FIG. 25 is a diagram showing an example of recorded contents after the photomovie generation processing.

FIG. 25 shows recorded contents of the disk D after photomovie generation processing and finalization processing according to the fifth exemplary embodiment are performed on the recorded contents of the disk D shown in FIG. 17.

In the photomovie generation processing, the still images 1701 to 1703 shown in FIG. 17 are converted into image data 2501 to 2503 encoded according to the MPEG coding method by the camera control unit 111 and the recorder control unit 121. The image data 2501 to 2503 respectively constitute S_VOB #1 of the first group, S_VOB #1 of the second group, and VOB #j of the last group.

The recorder control unit 121 generates a still image group S_VOG grouped for every a maximum of 64 S_VOBs by dividing S_VOBs at a switching point of the aspect ratio. The recorder control unit 121 records a still image video file VR_STILL.VRO obtained by integrating all S_VOGs as a file on the disk D. The recorder control unit 121 also records management information S_VOGI of each S_VOG in a VMG file.

The S_VOGI includes S_VOG attribute information S_VOG_GI and filter information S_VOB Entries for converting a still image number and an address in a group. The S_VOG_GI includes a number of S_VOB stream information S_VOB_STI. The S_VOB_STI contains information on an aspect ratio used for reproducing a still image in the group, including one of aspect ratios of 16:9 and 4:3.

In the case shown in FIG. 25, the recorder control unit 121 sets the aspect ratio to 16:9 in S_VOB_STI for S_VOGI of the S_VOGI #2. Information indicating that the aspect ratio is 4:3 is stored in S_VOB_STI for the S_VOGI #1 and #i.

The recorder control unit 121 adds management information Program #2 for referring to video data of the generated still image to management information Program Set contained in a VMG file for referring to all the video data contained in the DVD. The management information Program is formed by integrating a plurality of S_Cells. The S_Cell includes numbers of a head still image and an end still image of a corresponding still image group. With these still image numbers passed through a filter of the S_VOB Entries contained in the S_VOGI, each still image can be reproduced.

When the photomovie thus generated is displayed on a wide-screen television set, images 2501 and 2503 are reproduced as video data having an aspect ratio of 4:3. As a result, the images 2501 and 2503 are padded with black images of necessary minimum amounts on the left and right sides, and each object is displayed at an original aspect ratio. The entire image is displayed without being cropped.

The image 2502 is reproduced as video data having an aspect ratio of 16:9. As a result, an object is displayed at an original aspect ratio, and the entire image is displayed without being cropped.

When the photomovie thus generated is displayed on a television set having an aspect ratio of 4:3, the images 2501 and 2503 are reproduced as vide data having an aspect ratio 4:3. As a result, each object is displayed at an original aspect ratio. The entire image is displayed without being cropped.

The image 2502 is reproduced as video data having an aspect ratio of 16:9. As a result, the image is padded with a black image of a minimum necessary amount on the top and bottom sides, and an object is displayed at an original aspect ratio. The entire image is displayed without being cropped.

Sixth Exemplary Embodiment

A video camera according to a sixth exemplary embodiment is different from that of the fifth exemplary embodiment in that the video camera generates a photomovie while storing still images having the same aspect ratio in the same still image group irrespective of the order of recording. According to the sixth exemplary embodiment, the video camera further generates a play list to enable each picture of the photomovie to be reproduced in the order of recording of original still images.

Figure 26:
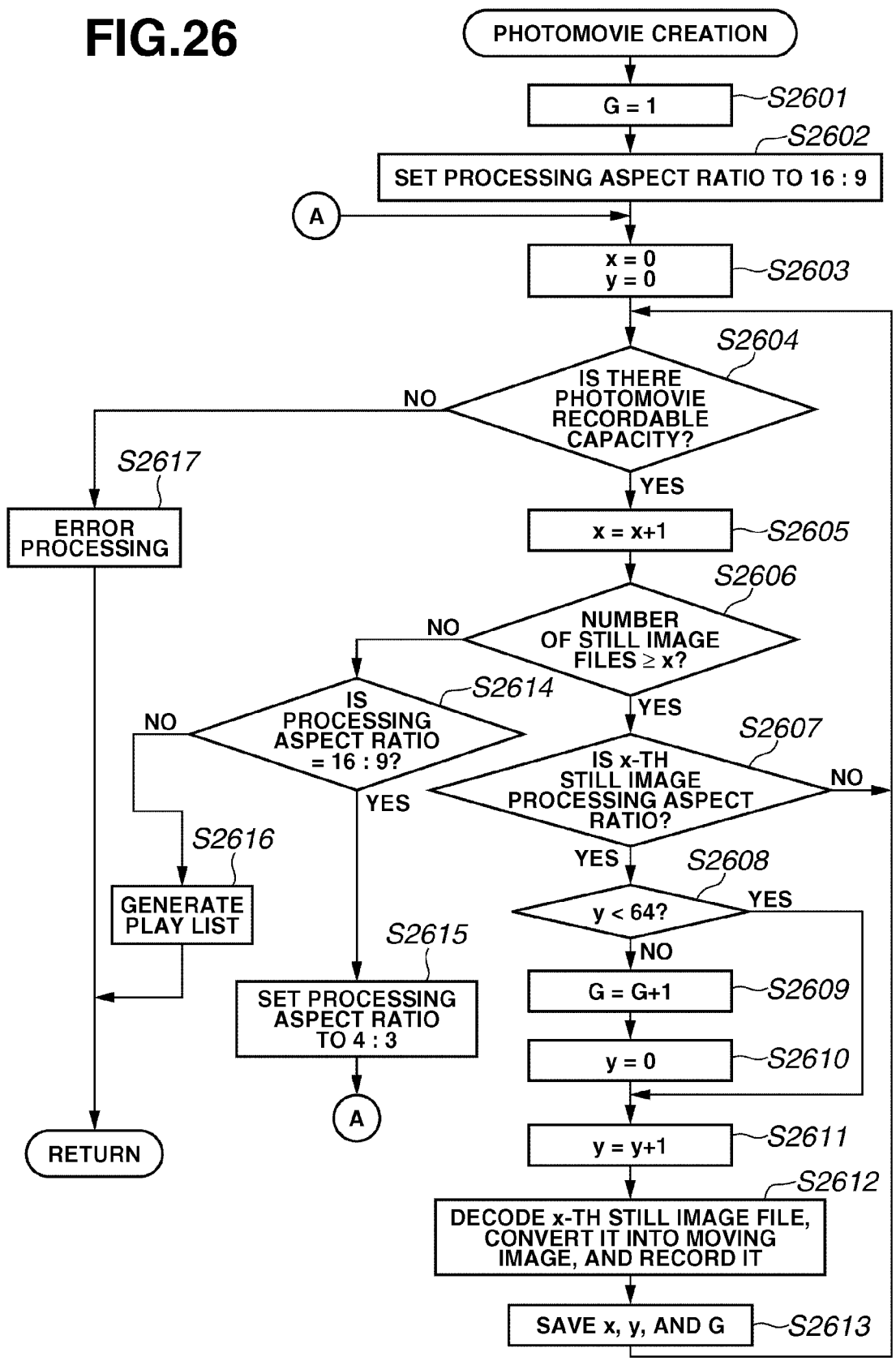
FIG. 26 is a flowchart showing an example of the photomovie generation processing.

FIG. 26 is a flowchart showing photomovie generation processing according to the sixth exemplary embodiment.

First, in step S2601, the CPU 102 initializes a group number G.

Then, in step S2602, the CPU 102 sets the aspect ratio of a still image file for generating a photomovie to 16:9.

In step S2603, the CPU 102 initializes a number x indicating the number of processed still image files and a number y indicating the number of still images recorded in the group G. In step S2604, the CPU 102 determines whether a photomovie can be recorded on the disk D based on a recording residual capacity of the disk D.

If a result of the determination indicates that the residual capacity of the disk D is not sufficient (NO in step S2604), the process proceeds to error processing in step S2617. If the residual capacity is sufficient (YES in step S2604), the CPU 102 increments the number x in step S2605. In step S2606, the CPU 102 determines whether the number x of currently processed still image files is equal to or less than the number of all still image files recorded on the disk D.

If a result of the determination indicates that the number x is equal to or less than the number of all still image files (YES in step S2606), the process proceeds to step S2607. In step S2607, the CPU 102 determines whether the aspect ratio of the x-th still image file which is currently processed is equal to a currently set processing aspect ratio. If the aspect ratio of the x-th still image file is not equal to the processing aspect ratio (NO in step S2607), the process returns to step S2604. If the aspect ratio of the x-th still image file is equal to the processing aspect ratio, the process proceeds to step S2608.

In step S2608, the CPU 102 determines whether the number y of still image files recorded in the group G is less than "64".

The process proceeds to step S2611 if a result of the determination indicates that the number y of still image files is less than "64" (YES in step S2608). If the number y is equal to or larger than "64" (NO in step S2608), the process proceeds to step S2609. In step S2609, the CPU 102 increments the group number G. In step S2610, the CPU 102 initializes the number y of recorded still image files.

In step S2611, the CPU 102 increments the number y of recorded still image files. In step S2612, the CPU 102 decodes the x-th recorded still image file and converts the size of the decoded still image. Then, the CPU 102 converts the still image data into moving image data and records the moving image data on the disk D.

Then, in step S2613, in order to generate a play list later, the CPU 102 saves the current values of x, y and G, as information for correlating the order of recording with positions of recording, to the RAM 103. Then, the process returns to step S2604.

If a result of the determination in step S2606 indicates that the number x is larger than the number of all still image files (NO in step S2606), the process proceeds to step S2614. In step S2614, the CPU 102 determines whether the current processing aspect ratio is 16:9. If the processing aspect ratio is 16:9 (YES in step S2614), the process proceeds to step S2615. In step S2615, in order to generate a photomovie having an aspect ratio of 4:3, the CPU 102 sets the processing aspect ratio to 4:3. Then, the process returns to step S2603.

If the processing aspect ratio is 4:3 (NO in step S2614), the CPU 102 determines that generation of a photomovie having an aspect ratio of 4:3 has also been finished. Then, the process proceeds to step S2616. In step S2616, the CPU 102 generates, using each information saved in step S2613, a play list describing the order of reproduction for reproducing pictures of the photomovie in the order of recording of original still images and records the play list on the disk D. As all of the still image files have been processed, the photomovie generation processing ends.

In error processing in step S2617, the CPU 102 displays a message indicating that the photomovie generation processing has not been finished normally on the display unit 126. Then, the photomovie generation processing ends.

Figure 27:
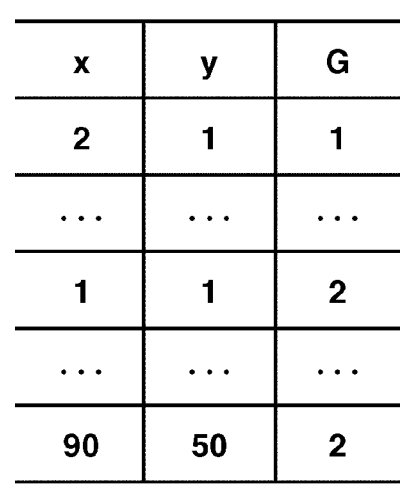

FIG. 27 illustrates an example of values of x, y, and G saved when a photomovie is generated as described above with respect to the recorded contents of the disk D shown in FIG. 17. In this case, x indicates the order of recording of original still images, and G and y specify a group having still images recorded therein and positions in the group.

Figure 28:
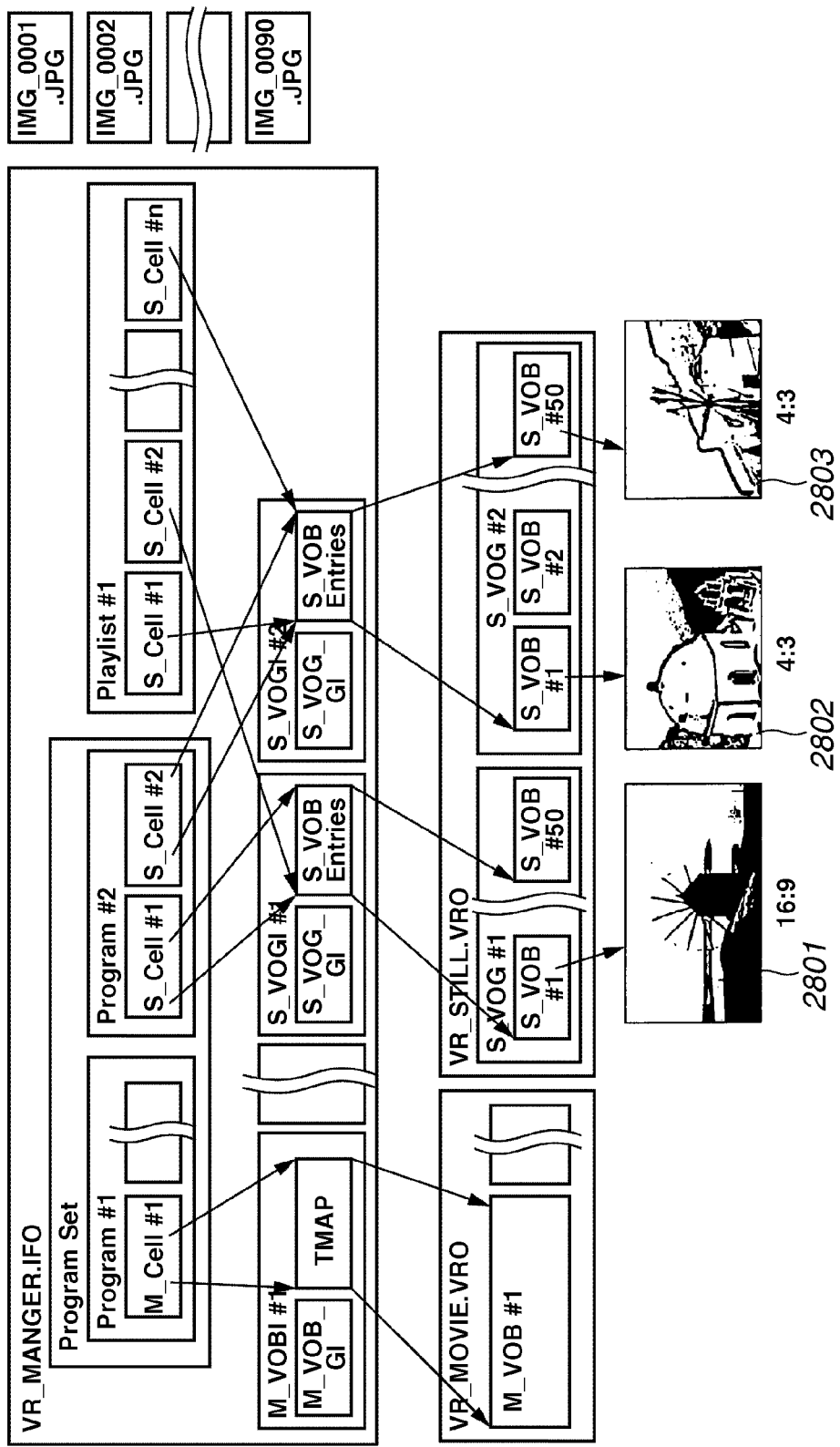
FIG. 28 is a diagram showing an example of recorded contents after the photomovie generation processing.

FIG. 28 shows recorded contents of the disk D after photomovie generation processing and finalization processing according to the sixth exemplary embodiment are performed on the recorded contents of the disk D shown in FIG. 17. It is presumed that, among 90 still image files, 50 still images have an aspect ratio of 4:3 and the rest of still images has an aspect ratio of 16:9.

In the photomovie generation processing, the still images 1701 to 1703 shown in FIG. 17 are encoded by the camera control unit 111 and the recorder control unit 121 according to the MPEG coding method to be converted into image data 2801 to 2803, respectively. The image data 2801 to 2803 respectively constitute S_VOB #1 of a first group, S_VOB #1 of a second group, and S_VOB #50 of the first group.

The recorder control unit 121 generates a still image group S_VOG grouped for every a maximum of 64 S_VOBs having the same aspect ratio. Then, the recorder control unit 121 generates a still image video file VR_STILL.VRO by integrating all S_VOGs and records the still image video file VR_STILL.VRO as a file compliant with the UDF on the disk D.

The recorder control unit 121 records management information S_VOGI for each S_VOG in a VMG file. The management information S_VOGI includes attribute information S_VOG_GI of the corresponding S_VOG and filter information S_VOB Entries for converting a still image number and an address in a group.

The attribute information S_VOG_GI includes a number of stream information S_VOB_STI of the S_VOB. The stream information S_VOB_STI contains information on an aspect ratio for reproducing a still image in the group, including one of aspect ratios 16:9 and 4:3.

In the case shown in FIG. 28, the recorder control unit 121 sets an aspect ratio of 16:9 in S_VOB_STI for the S_VOGI #2, and sets an aspect ratio of 4:3 in S_VOB_STI for the S_VOGI #1.

The recorder control unit 121 adds management information Program #2 for referring to video data of the generated still image to management information Program Set contained in a VMG file for referring to all the video data contained in the DVD. The management information Program is formed by integrating a plurality of S_Cells, and numbers of a head still image and an end still image of a corresponding still image group are stored in the S_Cell. With these still image numbers passed through a filter of the S_VOB Entries contained in the S_VOGI, each still image can be reproduced.

According to the sixth exemplary embodiment, however, still images are grouped for each aspect ratio without sectioning them in the order of recording, and the S_Cell of the Program #2 causes still images of the corresponding group to be reproduced from a head still image to an end still image in order. Therefore, when a photomovie is reproduced according to the Program #2, still images are reproduced in the order different from the order of recording of original still images.

On the other hand, according to a play list Playlist #1 generated in the VMG file by the recorder control unit 121, a photomovie can be reproduced in the order of recording of original still images.

Thus, the recorder control unit 121 generates a new S_Cell at a point of time when a group to which an original still image belongs is switched from a group to which a previous still image belongs according to each information shown in FIG. 27. Then, the recorder control unit 121 records, in the S_Cell, numbers of head and end still images included within a range before the group is switched.

In the example shown in FIG. 28, S_Cell #1 of Playlist #1 includes a number of only an image 2802 of the S_VOG #2. S_Cell #2 includes a number of an image 2801 of the S_VOG #1 as a head number. S_Cell #n includes a number of an image 2803 of the S_VOG #2 as an end number.

When the photomovie thus generated is displayed on a wide-screen television set according to the above-described play list, still images are reproduced in the order of recording. The images 2801 and 2803 are reproduced as video data having an aspect ratio of 4:3. As a result, the images 2801 and 2803 are padded with black images of necessary minimum amounts on the left and right sides, and each object is displayed at an original aspect ratio. The entire image is displayed without being cropped.

The image 2802 is reproduced as video data having an aspect ratio of 16:9. As a result, an object is displayed at an original aspect ratio, and the entire image is displayed without being cropped.

When the photomovie thus generated is displayed on a television set having an aspect ratio of 4:3 according to the above-described play list, still images are reproduced in the order of recording. The images 2801 and 2803 are reproduced as vide data having an aspect ratio of 4:3. As a result, each object is displayed at an original aspect ratio. The entire image is displayed without being cropped.

The image 2802 is reproduced as video data having an aspect ratio of 16:9. As a result, the image 2802 is padded with a black image of a minimum necessary amount on the top and bottom sides, and an object is displayed at an original aspect ratio. The entire image is displayed without being cropped.

Each of the exemplary embodiments has been described by way of a case where two aspect ratios of 16:9 and 4:3 can be selected as an aspect ratio of image data to be recorded. However, the present invention can also be applied to an apparatus capable of recording or reproducing images having a plurality of other aspect ratios.

Other Exemplary Embodiments

Various units constituting an image processing apparatus and various steps of an image processing method according to the exemplary embodiments of the present invention can be realized by operating a program stored in a RAM or a ROM of a computer. The present invention includes the program and a computer-readable recording medium storing the program.

The present invention can be embodied as, e.g., a system, an apparatus, a method, a program, a storage medium, or the like. Specifically, the present invention can be applied to a system including a plurality of devices, or an apparatus including one device.

The present invention includes supplying a software program for realizing the functions of the embodiments (according to the exemplary embodiments, a program corresponding to the flowcharts of FIGS. 6, 8, 13, 15, 19, 24, and 26) to a system or an apparatus directly or from a remote place. Then, a computer of the system or the apparatus can read and execute the supplied program.

Accordingly, program code installed in the computer to realize the functions of the exemplary embodiments via the computer can implement the present invention. Thus, the present invention includes a computer program for realizing the functions of the exemplary embodiments.

In that case, the program includes object code, a program executed by an interpreter, script data supplied to an operating system (OS), or the like, as long as it has a program function.

A recording medium for supplying a program includes, for example, a floppy disk, a hard disk, an optical disk, a magneto-optical disk (MO), a compact disc read-only memory (CD-ROM), a compact disc-recordable (CD-R), a compact disc-rewritable (CD-RW), a magnetic tape, a nonvolatile memory card, a ROM, a DVD (DVD-ROM, or DVD-R), and the like.

According to another program supplying method, a user can access a website of the Internet using a browser of a client computer. Then, a user can download a computer program itself, or a compressed file containing an automatic install function, from the website onto a recording medium such as a hard disk.

Program code constituting the program according to the present invention can be divided into a plurality of files. Then, a user can download the files from different websites. Thus, the present invention includes a World Wide Web (WWW) server for allowing a plurality of users to download the program files to realize the functions of the exemplary embodiments.

The program according to the present invention can be encrypted and stored in a storage medium such as a CD-ROM. The storage medium can be distributed to users. Then, users who meet predetermined conditions are permitted to download key information to decrypt the program from the website via the Internet. Then, using the downloaded key information, a user can execute the encrypted program to be installed on a computer.

The functions of the exemplary embodiments can be realized by executing the read program via a computer. Additionally, an OS or the like operating in the computer can execute a part or the whole of the actual processing to realize the functions of the exemplary embodiments.

Furthermore, a program read from a storage medium can be written in a memory disposed in a function extension board inserted into a computer or a function extension unit connected to a computer. Then, based on instructions of the program, a CPU or the like disposed in the function extension board or the function extension unit can execute a part or the whole of the actual processing to realize the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-053382 filed Feb. 28, 2006, which is hereby incorporated by reference herein in its entirety.

What is claimed is:

1. An image processing apparatus for processing a plurality of still image data which have respective different aspect ratios and are recorded on a recording medium, the image processing apparatus comprising:
   a reading unit configured to read the still image data from the recording medium;
   a generation unit configured to generate one moving image data using the plurality of still image data read from the recording medium by the reading unit; and
   a control unit configured to select a plurality of different still image data which have the same aspect ratio and are used for generating one moving image data by the generation unit among the plurality of still image data recorded on the recording medium in accordance with aspect ratios of the plurality of still image data recorded on the recording medium, wherein the control unit controls the reading unit to read from the recording medium the selected plurality of different still image data having the same aspect ratio and controls the generation unit such that the generation unit generates the one moving image data using the selected plurality of different still image data which are read from the recording medium by the reading unit and have the same aspect ratio and without using the still image data having an aspect ratio different from the same aspect ratio.

2. The apparatus according to claim 1, wherein the still image data is encoded in accordance with JPEG encoding system, and the generation unit generates the one moving image data by encoding the still image data in accordance with MPEG encoding system.

3. The apparatus according to claim 1, wherein the plurality of still image data includes the still image data having a first aspect ratio and the still image data having a second aspect ratio different from the first aspect ratio, and the control unit controls the generation unit such that the generation unit generates the one moving image data having the first aspect ratio using the plurality of still image data which are read by the reading unit and have the first aspect ratio among the plurality of still image data recorded on the recording medium and without using the still image data having the second aspect ratio.

4. The apparatus according to claim 1, wherein the plurality of still image data includes the still image data having a first aspect ratio and the still image data having a second aspect ratio different from the first aspect ratio, and wherein the control unit controls the generation unit such that the generation unit generates first moving image data having the first aspect ratio using the plurality of still image data which are read by the reading unit and have the first aspect ratio among the plurality of still image data recorded on the recording medium and without using the still image data having the second aspect ratio, and generates second moving image data having the second aspect ratio using the plurality of still image data which are read by the reading unit and have the second aspect ratio among the plurality of still image data recorded on the recording medium and without using the still image data having the first aspect ratio.

5. The apparatus according to claim 1, wherein the control unit selects the plurality of still image data having the same aspect ratio among the plurality of still image data recorded on the recording medium and controls the generation unit such that the generation unit generates the one moving image data using the plurality of selected still image data read by the reading unit without changing the aspect ratio of the selected still image data.

6. The apparatus according to claim 1, wherein the reading unit reads the plurality of still image data selected by a user from the recording medium and the control unit controls the generation unit such that the generation unit generates the one moving image data using the plurality of selected still image data read from the recording medium by the reading unit.

7. An image processing method for processing a plurality of still image data which have respective different aspect ratios and are recorded on a recording medium, the image processing method comprising:

reading the still image data from the recording medium;
generating one moving image data using the plurality of still image data read from the recording medium; and
selecting a plurality of different still image data which have the same aspect ratio and are used for generating one moving image data among the plurality of still image data recorded on the recording medium in accordance with aspect ratios of the plurality of still image data recorded on the recording medium, wherein reading from the recording medium the selected plurality of different still image data having the same aspect ratio and controlling the generation of the one moving image data such that the one moving image data is generated using the selected plurality of different still image data which are read from the recording medium and have the same aspect ratio and without using the still image data having an aspect ratio different from the same aspect ratio.

8. The image processing method according to claim 7, wherein the still image data is encoded in accordance with JPEG encoding system, and generates the one moving image data by encoding the still image data in accordance with MPEG encoding system.

9. The image processing method according to claim 7, wherein the plurality of still image data includes the still image data having a first aspect ratio and the still image data having a second aspect ratio different from the first aspect ratio, and generating the one moving image data having the first aspect ratio using the plurality of still image data and have the first aspect ratio among the plurality of still image data recorded on the recording medium and without using the still image data having the second aspect ratio.

10. The image processing method according to claim 7, wherein the plurality of still image data includes the still image data having a first aspect ratio and the still image data having a second aspect ratio different from the first aspect ratio, and wherein generating first moving image data having the first aspect ratio using the plurality of still image data and have the first aspect ratio among the plurality of still image data recorded on the recording medium and without using the still image data having the second aspect ratio, and generates second moving image data having the second aspect ratio using the plurality of still image data which and have the second aspect ratio among the plurality of still image data recorded on the recording medium and without using the still image data having the first aspect ratio.

11. The image processing method according to claim 7, wherein selecting the plurality of still image data having the same aspect ratio among the plurality of still image data recorded on the recording medium and controls the generation of the one moving image data using the plurality of selected still image data without changing the aspect ratio of the selected still image data.

12. The image processing method according to claim 7, wherein reading the plurality of still image data selected by a user from the recording medium and controlling the generation of the one moving image data using the plurality of selected still image data read from the recording medium.

13. A non-transitory computer-readable storage medium storing a program causing a computer to execute image processing, the image processing comprising:

reading the still image data from the recording medium;
generating one moving image data using the plurality of still image data read from the recording medium; and
selecting a plurality of different still image data which have the same aspect ratio and are used for generating one moving image data among the plurality of still image data recorded on the recording medium in accordance with aspect ratios of the plurality of still image data recorded on the recording medium, wherein reading from the recording medium the selected plurality of different still image data having the same aspect ratio and controlling the generation of the one moving image data such that the one moving image data is generated using the selected plurality of different still image data which are read from the recording medium and have the same aspect ratio and without using the still image data having an aspect ratio different from the same aspect ratio.

14. The non-transitory computer-readable storage medium according to claim 13, wherein the still image data is encoded in accordance with JPEG encoding system, and generates the one moving image data by encoding the still image data in accordance with MPEG encoding system.

15. The non-transitory computer-readable storage medium according to claim 13, wherein the plurality of still image data includes the still image data having a first aspect ratio and the still image data having a second aspect ratio different from the first aspect ratio, and generating the one moving image data having the first aspect ratio using the plurality of still image data and have the first aspect ratio among the plurality of still image data recorded on the recording medium and without using the still image data having the second aspect ratio.

16. The non-transitory computer-readable storage medium according to claim 13, wherein the plurality of still image data includes the still image data having a first aspect ratio and the still image data having a second aspect ratio different from the first aspect ratio, and wherein generating first moving image data having the first aspect ratio using the plurality of still image data and have the first aspect ratio among the plurality of still image data recorded on the recording medium and without using the still image data having the second aspect ratio, and generates second moving image data having the second aspect ratio using the plurality of still image data and have the second aspect ratio among the plurality of still image data recorded on the recording medium and without using the still image data having the first aspect ratio.

17. The non-transitory computer-readable storage medium according to claim 13, wherein selecting the plurality of still image data having the same aspect ratio among the plurality of still image data recorded on the recording medium and generating the one moving image data using the plurality of selected still image data without changing the aspect ratio of the selected still image data.

18. The non-transitory computer-readable storage medium according to claim 13, wherein reading the plurality of still image data selected by a user from the recording medium and generating the one moving image data using the plurality of selected still image data.

* * * * *